(12) United States Patent
Seiders et al.

(10) Patent No.: US 10,034,580 B2
(45) Date of Patent: Jul. 31, 2018

(54) CONTAINER AND HANDLE AND METHOD OF FORMING A CONTAINER AND HANDLE

(71) Applicant: YETI Coolers, LLC, Austin, TX (US)

(72) Inventors: Roy Joseph Seiders, Austin, TX (US); Steve Charles Nichols, Austin, TX (US); Chris Nickolas Kaschner, Austin, TX (US)

(73) Assignee: YETI Coolers, LLC, Austin, TX (US)

( * ) Notice: Subject to any disclaimer, the term of this patent is extended or adjusted under 35 U.S.C. 154(b) by 0 days.

(21) Appl. No.: 15/183,427

(22) Filed: Jun. 15, 2016

(65) Prior Publication Data

US 2017/0096258 A1 Apr. 6, 2017

Related U.S. Application Data

(60) Provisional application No. 62/255,886, filed on Nov. 16, 2015, provisional application No. 62/237,419, filed on Oct. 5, 2015.

(51) Int. Cl.

| | | |
|---|---|---|
| *A47J 41/02* | (2006.01) | |
| *B65D 81/38* | (2006.01) | |
| *A47G 19/22* | (2006.01) | |
| *B65D 25/28* | (2006.01) | |
| *A47J 41/00* | (2006.01) | |
| *F16L 59/06* | (2006.01) | |

(52) U.S. Cl.
CPC ........ *A47J 41/028* (2013.01); *A47G 19/2288* (2013.01); *A47J 41/0072* (2013.01); *B65D 25/2817* (2013.01); *B65D 81/3806* (2013.01); *B65D 81/3869* (2013.01); *F16L 59/06* (2013.01)

(58) Field of Classification Search
CPC ............ B65D 25/2817; B65D 81/3806; B65D 81/3869; A47G 19/2288; A47J 41/028; A47J 41/022; A47J 41/02; A47J 41/0072; A47J 41/0055; A47J 45/06; A61J 1/16; B25G 1/10
USPC .......... 220/759, 752, 741, 737, 742, 592.17, 220/592.16, 62.18; 16/425, 422, 110.1; 215/396, 395; D9/443; D7/393, 394
See application file for complete search history.

(56) References Cited

U.S. PATENT DOCUMENTS

| | | |
|---|---|---|
| D2,440 S | 9/1866 | Matthews, Jr. |
| 604,514 A | 5/1898 | Belden |
| 899,290 A | 9/1908 | Bricker |

(Continued)

FOREIGN PATENT DOCUMENTS

| | | | |
|---|---|---|---|
| CH | 561528 A5 * | 5/1975 | ......... A47G 19/2288 |
| EP | 0717949 B1 | 4/2002 | |

(Continued)

OTHER PUBLICATIONS

Translation of CH 561528 (Gottfried), May 15, 1975, p. 3.*

(Continued)

*Primary Examiner* — Robert J Hicks
(74) *Attorney, Agent, or Firm* — Banner & Witcoff, Ltd.

(57) ABSTRACT

Containers can be configured to retain a volume of liquid, and include a first inner wall having a first end having an opening extending into an internal reservoir, and a second outer wall forming an outer shell. The second outer wall can include a second end configured to support the container on a surface. The containers can include a removably engaged handle.

21 Claims, 21 Drawing Sheets

(56) References Cited

U.S. PATENT DOCUMENTS

| | | |
|---|---|---|
| 1,133,420 A | 3/1915 | Young |
| D47,798 S | 9/1915 | Pick |
| 2,029,429 A | 2/1936 | Koons |
| D100,871 S | 8/1936 | Marcus |
| 2,070,414 A | 2/1937 | Snell |
| 2,088,387 A | 7/1937 | Rice, Jr. |
| 2,128,466 A | 8/1938 | MacHotka |
| 2,215,402 A | 9/1940 | McDonald |
| 2,378,867 A | 6/1945 | Reichart |
| D157,491 S | 2/1950 | Heintze |
| 2,643,021 A * | 6/1953 | Freedman ............. A47J 41/022 215/13.1 |
| D177,559 S | 5/1956 | Emmert |
| 2,871,051 A | 1/1959 | Nesslein |
| D186,555 S | 11/1959 | Hunt |
| 2,928,570 A | 3/1960 | Fitch |
| 2,981,562 A | 4/1961 | Long |
| 3,107,029 A | 10/1963 | Rylander |
| 3,202,309 A | 8/1965 | Simpson |
| 3,261,633 A | 7/1966 | Sakuta |
| 3,342,370 A | 9/1967 | Johnson |
| D209,308 S | 11/1967 | Schilling |
| D209,533 S | 12/1967 | Cole |
| D211,818 S | 7/1968 | Massey |
| 3,458,164 A | 7/1969 | Massey |
| D217,781 S | 6/1970 | Stone |
| 3,679,253 A | 7/1972 | Simms |
| 3,682,352 A | 8/1972 | Doucette |
| D225,792 S | 1/1973 | Fritsche |
| D229,006 S | 11/1973 | Sauey |
| 3,979,011 A | 9/1976 | Schleicher |
| 4,120,073 A | 10/1978 | Studebaker |
| 4,127,915 A | 12/1978 | Logan et al. |
| D251,175 S | 2/1979 | Logan et al. |
| D254,417 S | 3/1980 | DeMars et al. |
| D256,418 S | 8/1980 | Corbett |
| D258,795 S | 4/1981 | Zamorski |
| D265,159 S | 6/1982 | La Barbera |
| D265,279 S | 7/1982 | Wright |
| D265,880 S | 8/1982 | Craig |
| D268,319 S | 3/1983 | Donoski et al. |
| D269,147 S | 5/1983 | Trombly |
| 4,560,075 A | 12/1985 | Lu |
| D285,032 S | 8/1986 | Alonzo |
| D287,451 S | 12/1986 | Schrock |
| 4,654,274 A | 3/1987 | DeMars |
| D289,484 S | 4/1987 | Forquer et al. |
| D298,200 S | 10/1988 | Block et al. |
| 4,848,625 A | 7/1989 | Lucia |
| D302,634 S | 8/1989 | Segal |
| 4,993,675 A | 2/1991 | Walker |
| 4,997,124 A | 3/1991 | Kitabatake et al. |
| 5,029,720 A | 7/1991 | Bridges |
| 5,168,793 A | 12/1992 | Padamsee |
| D337,029 S | 7/1993 | McKechnie |
| D357,387 S | 4/1995 | Davidson et al. |
| 5,427,269 A | 6/1995 | Willbrandt |
| 5,433,337 A | 7/1995 | Willbrandt |
| D362,369 S | 9/1995 | Bridges |
| D363,414 S | 10/1995 | Goto et al. |
| D363,641 S | 10/1995 | Goto et al. |
| D370,384 S | 6/1996 | Shamis |
| D372,839 S | 8/1996 | Laib |
| 5,593,053 A | 1/1997 | Kaufman et al. |
| D379,738 S | 6/1997 | Liming et al. |
| D382,174 S | 8/1997 | Grimm |
| 5,655,805 A | 8/1997 | Shaddy |
| D384,557 S | 10/1997 | Goza |
| 5,678,725 A * | 10/1997 | Yamada ............. A47J 41/0077 220/592.21 |
| D386,948 S | 12/1997 | Wissinger |
| D395,238 S | 6/1998 | Freitas |
| D395,825 S | 7/1998 | Freitas |
| D396,381 S | 7/1998 | Chung |
| 5,788,298 A | 8/1998 | Cheng |
| D398,187 S | 9/1998 | Parker |
| 5,799,369 A | 9/1998 | Schulein |
| 5,816,631 A | 10/1998 | Kochan |
| 5,848,722 A | 12/1998 | Hanes |
| 5,868,310 A | 2/1999 | Leszczynski |
| D412,806 S | 8/1999 | Pierce |
| D416,757 S | 11/1999 | Ginuntoli |
| D417,589 S | 12/1999 | Parker |
| D417,819 S | 12/1999 | Kelly-Pollet |
| D418,013 S | 12/1999 | Fujii |
| D427,853 S | 7/2000 | Kohlhase |
| D429,607 S | 8/2000 | Prim |
| 6,102,458 A | 8/2000 | Scace |
| D432,865 S | 10/2000 | Cohen |
| 6,135,312 A | 10/2000 | Chen et al. |
| D433,876 S | 11/2000 | Freed |
| D434,275 S | 11/2000 | Ginuntoli et al. |
| 6,149,028 A | 11/2000 | Yu |
| D436,295 S | 1/2001 | Furman et al. |
| D437,187 S | 2/2001 | Cheng |
| D439,473 S | 3/2001 | Lin |
| 6,216,909 B1 | 4/2001 | Lin |
| 6,237,801 B1 | 5/2001 | Liu |
| 6,241,415 B1 | 6/2001 | Stark |
| 6,260,732 B1 | 7/2001 | Khodush |
| D446,687 S | 8/2001 | Furman et al. |
| 6,332,557 B1 | 12/2001 | Moran |
| 6,352,235 B2 | 3/2002 | Cizek |
| 6,360,913 B1 | 3/2002 | Bruinsma et al. |
| D455,613 S | 4/2002 | Bruinsma et al. |
| D456,578 S | 4/2002 | Smith et al. |
| D457,389 S | 5/2002 | Snell |
| D458,081 S | 6/2002 | Bodum |
| RE37,773 E | 7/2002 | Trombley |
| D460,895 S | 7/2002 | Lin |
| D462,879 S | 9/2002 | Martens |
| 6,450,363 B1 | 9/2002 | Lin |
| D463,715 S | 10/2002 | Dretzka |
| D465,132 S | 11/2002 | Janky et al. |
| D466,371 S | 12/2002 | Parker |
| D471,763 S | 3/2003 | Hurlbut et al. |
| D472,101 S | 3/2003 | Janky |
| 6,557,751 B2 | 5/2003 | Puerini |
| D476,193 S | 6/2003 | Janky |
| D477,185 S | 7/2003 | Janky |
| 6,588,064 B2 | 7/2003 | Baum |
| D479,090 S | 9/2003 | Backes et al. |
| D480,904 S | 10/2003 | Backes et al. |
| D480,918 S | 10/2003 | Belton et al. |
| D483,165 S | 12/2003 | Dretzka |
| D483,995 S | 12/2003 | Otake |
| D484,361 S | 12/2003 | Jeung |
| 6,658,701 B1 | 12/2003 | DeHart et al. |
| D488,673 S | 4/2004 | Farce |
| D489,577 S | 5/2004 | Giampavolo |
| D490,274 S | 5/2004 | Irvine |
| 6,729,665 B1 | 5/2004 | Posey et al. |
| D493,068 S | 7/2004 | Slater et al. |
| 6,852,954 B1 | 2/2005 | Liu et al. |
| 6,864,462 B2 | 3/2005 | Sanoner et al. |
| 6,962,265 B1 | 11/2005 | Zhang |
| D512,272 S | 12/2005 | Avrish |
| D512,275 S | 12/2005 | Kent-Fawkes |
| 6,979,031 B2 | 12/2005 | Coppotelli et al. |
| D523,693 S | 6/2006 | Bodum |
| D524,607 S | 7/2006 | Kent-Fawkes |
| D529,763 S | 10/2006 | Zerillo et al. |
| D531,454 S | 11/2006 | Zerillo et al. |
| D533,748 S | 12/2006 | Bresler |
| D534,038 S | 12/2006 | Kramer et al. |
| D534,396 S | 1/2007 | Kramer |
| D536,930 S | 2/2007 | Li |
| D537,676 S | 3/2007 | Kingsley |
| D537,677 S | 3/2007 | Bresler |
| 7,195,137 B2 | 3/2007 | Belcastro |
| D539,609 S | 4/2007 | Ying et al. |
| 7,207,538 B2 | 4/2007 | Kent-Fawkes |
| D548,012 S | 8/2007 | Tien |
| D548,599 S | 8/2007 | Blasko |

(56) References Cited

U.S. PATENT DOCUMENTS

| | | |
|---|---|---|
| D553,440 S | 10/2007 | Bodum |
| 7,284,777 B1 | 10/2007 | Kraemer |
| D557,567 S | 12/2007 | Gronikowski et al. |
| D560,512 S | 1/2008 | Safar |
| D561,590 S | 2/2008 | Kingsley |
| D562,072 S | 2/2008 | Wahl |
| D565,901 S | 4/2008 | Edelstein et al. |
| D566,471 S | 4/2008 | Bodum |
| D568,107 S | 5/2008 | Bhavnani |
| D568,685 S | 5/2008 | Bodum |
| D569,183 S | 5/2008 | Blake |
| D577,260 S | 9/2008 | Bodum |
| D587,523 S | 3/2009 | Moon |
| D587,967 S | 3/2009 | Wahl |
| D588,912 S | 3/2009 | Christensen et al. |
| D592,015 S | 5/2009 | Carpenter |
| D592,058 S | 5/2009 | Rapaport |
| 7,527,310 B2 | 5/2009 | Shaskey, Sr. |
| D593,859 S | 6/2009 | Barnum |
| D595,133 S | 6/2009 | Lewis |
| D598,747 S | 8/2009 | Caldwell |
| D600,073 S | 9/2009 | Carreno |
| 7,581,704 B1 | 9/2009 | Pugsley |
| 7,581,770 B2 | 9/2009 | Jones |
| 7,604,270 B1 | 10/2009 | McCarthy |
| D604,103 S | 11/2009 | Alviar et al. |
| D609,534 S | 2/2010 | Traficante et al. |
| 7,686,183 B2 | 3/2010 | Ziegler |
| D613,554 S | 4/2010 | Koennecke |
| D615,366 S | 5/2010 | Berezansky |
| D617,640 S | 6/2010 | Jones |
| D618,964 S | 7/2010 | Eisenhardt |
| D619,419 S | 7/2010 | McClellan et al. |
| D622,548 S | 8/2010 | Jensen et al. |
| D631,699 S | 2/2011 | Moreau |
| D636,640 S | 4/2011 | Latham |
| D638,651 S | 5/2011 | Butler |
| D643,289 S | 8/2011 | Harlan |
| D646,524 S | 10/2011 | Kortleven |
| D648,599 S | 11/2011 | Watanabe et al. |
| D650,232 S | 12/2011 | Gilbert |
| D652,256 S | 1/2012 | Eyal |
| D656,361 S | 3/2012 | Gilbert |
| D658,922 S | 5/2012 | Fallon et al. |
| D659,474 S | 5/2012 | Wahl et al. |
| D660,082 S | 5/2012 | Wahl |
| D664,001 S | 7/2012 | Liu |
| D667,268 S | 9/2012 | Pallotto |
| D669,735 S | 10/2012 | Wong |
| D670,525 S | 11/2012 | Fallon et al. |
| D675,063 S | 1/2013 | Wahl |
| 8,364,542 B2 | 1/2013 | Grauel et al. |
| D682,002 S | 5/2013 | Munson |
| 8,499,951 B1 | 8/2013 | McDonald et al. |
| D691,409 S | 10/2013 | Dichraff et al. |
| D693,176 S | 11/2013 | Kaiser |
| D693,649 S | 11/2013 | Yeung |
| 8,608,019 B2 | 12/2013 | Wren |
| D698,200 S | 1/2014 | Lauwagie |
| 8,684,430 B1 | 4/2014 | Brandon |
| D705,012 S | 5/2014 | Lapsker |
| 8,727,176 B2 | 5/2014 | El-Saden et al. |
| D709,328 S | 7/2014 | Ross |
| D709,737 S | 7/2014 | Weinert et al. |
| D709,738 S | 7/2014 | Weinert et al. |
| D712,701 S | 9/2014 | Boroski |
| D713,206 S | 9/2014 | Lane et al. |
| D713,686 S | 9/2014 | Eyal |
| D717,605 S | 11/2014 | Kristinik |
| D717,606 S | 11/2014 | Kristinik |
| D719,408 S | 12/2014 | Weber |
| D720,183 S | 12/2014 | Chiang |
| 8,899,644 B2 | 12/2014 | Hancey |
| 8,919,603 B2 | 12/2014 | Greene |
| D725,965 S | 4/2015 | Bo |
| D728,311 S | 5/2015 | Eyal |
| D728,312 S | 5/2015 | Bo |
| D728,313 S | 5/2015 | Bo |
| D729,009 S | 5/2015 | Merten |
| D729,581 S | 5/2015 | Boroski |
| D730,121 S | 5/2015 | Bo |
| 9,021,662 B1 | 5/2015 | Jones |
| 9,038,850 B1 | 5/2015 | Wilson |
| D731,251 S | 6/2015 | Lane |
| D732,338 S | 6/2015 | Boroski |
| D732,343 S | 6/2015 | Romley |
| D732,895 S | 6/2015 | McClellan |
| D734,096 S | 7/2015 | George et al. |
| D740,073 S | 10/2015 | Zorovich et al. |
| D740,077 S | 10/2015 | Strepkoff |
| D740,618 S | 10/2015 | Knoll |
| D743,209 S | 11/2015 | Maas et al. |
| D744,286 S | 12/2015 | Morris, II et al. |
| D750,426 S | 3/2016 | Bann et al. |
| D753,948 S | 4/2016 | Kestenbaum |
| D754,543 S | 4/2016 | Donadee et al. |
| D764,870 S | 8/2016 | Choi |
| D766,035 S | 9/2016 | Cox |
| D783,334 S | 4/2017 | Kotani |
| D787,251 S | 5/2017 | Kestenbaum |
| D787,260 S | 5/2017 | Krooshof |
| 2002/0066758 A1 | 6/2002 | Fadal et al. |
| 2004/0040962 A1* | 3/2004 | Bielecki ............ A47G 19/2272 220/254.1 |
| 2004/0187265 A1 | 9/2004 | Ho |
| 2005/0045643 A1 | 3/2005 | Ghanem |
| 2005/0218109 A1 | 10/2005 | Semersky et al. |
| 2006/0175506 A1 | 8/2006 | Lan |
| 2007/0295738 A1 | 12/2007 | Hussain |
| 2008/0012368 A1 | 1/2008 | Kent-Fawkes |
| 2008/0023434 A1 | 1/2008 | Takayama |
| 2008/0101056 A1 | 5/2008 | Bhavnani |
| 2009/0008399 A1 | 1/2009 | Mayled et al. |
| 2009/0065469 A1 | 3/2009 | McClellan et al. |
| 2010/0206874 A1 | 8/2010 | Masurier et al. |
| 2010/0288782 A1 | 11/2010 | Lin |
| 2011/0204017 A1 | 8/2011 | O'Sullivan |
| 2012/0074155 A1 | 3/2012 | Yeung |
| 2012/0261408 A1 | 10/2012 | White |
| 2013/0098932 A1 | 4/2013 | Hunt |
| 2013/0186849 A1 | 7/2013 | Iwashita |
| 2014/0186507 A1 | 7/2014 | Wales |
| 2015/0041480 A1 | 2/2015 | Ramsey |
| 2015/0102032 A1 | 4/2015 | Dunn et al. |
| 2015/0108150 A1 | 4/2015 | Garcia |
| 2015/0108152 A1 | 4/2015 | Franzen et al. |
| 2015/0164256 A1 | 6/2015 | Helton |
| 2015/0232232 A1 | 8/2015 | Shibuki et al. |
| 2015/0291316 A1 | 10/2015 | Fietz |

FOREIGN PATENT DOCUMENTS

| | | |
|---|---|---|
| GB | 2129117 A | 5/1984 |
| GB | 2354579 A | 3/2001 |
| JP | H11221667 A | 8/1999 |
| JP | 2011219126 A | 11/2011 |
| KR | 300779301 | 1/2015 |
| WO | 0162614 A1 | 8/2001 |
| WO | 2006048119 A1 | 5/2006 |
| WO | 2011022857 A2 | 3/2011 |
| WO | 2012064184 A1 | 5/2012 |
| WO | 2013163725 A1 | 11/2013 |

OTHER PUBLICATIONS

Translation of WO 2011/022857 (Bodum), Mar. 3, 2011, p. 11.*
Alexander, Emmet, "Removable Bicycle Cup Holder by Bookman", posted Mar. 23, 2014 online, retrieved Jun. 6, 2016 from Internet, URL: http://coolmensgear.com/removable-bicycle-cup-holder/.
Purdom, Sandra, "Mug or Tumbler Metal Handles Spare Parts", retrieved from Internet Jun. 6, 2016; URL: https://www.etsy.com/... r-tumbler-metalhandles-spare-parts?ga_order=most_relevant

(56) References Cited

OTHER PUBLICATIONS

&ga_search_type=all&ga_view_type=gallery&ga_search_query=metal%20handled%20mugs&ref=sr_gallery_8.
"Tervis Tumbler Black 24 Oz. Handle", retrieved from Internet Jun. 6, 2016; URL: http://www.amazon.com/Tervis-Tumbler-Black-24oz-Handle/dp/B004VVHORG.
"Red Removable Handle 16-Oz. Travel Tumbler", retrieved from Internet Jun. 6, 2016; URL: http://www.zulily.com/p/red-removable-handle-16-oz-travel-tumbler-120715-7353259.html.
"Meyers California Rainbow Mug With Removable Wood Metal Handle", retrieved from Internet on Jun. 6, 2016; URL: https://www.pinterest.com/pin/148618856430252325/.
Oct. 18, 2016—(JP) Office Action—App 2016-004374—English trans.
United States District Court for the Southern District of Texas Huston Division, "RTIC Drinkware's Original Complaint or Declaratory Judgment, Damages, and Injunctive Relief," *RTIC Drinkware, LLC v. YETI Coolers, LLC*, Case: 4:16-cv-01201, Document #1, filed May 2, 2016, 58 pages.
United States District Court Western District of Texas Austin Division, "[Proposed] Order Granting Stipulated Motion to Dismiss Defendant Polar Pad, LLC, Without Prejudice, Pursuant to Fed. R. Civ. P. 21," *YETI Coolers, LLC v. Polar Pad LLC, d/b/a Polar Pad Drifter, d/b/a Polar Pad, and Veterinary Internet Company, LLC, d/b/a VetInternetCo*, Case: 1:16-cv-00677-RP, Document #14, Sep. 15, 2016, 1 page.
United States District Court Western District of Texas Austin Division, "Answer," *YETI Coolers, LLC v. Tree Leaf Marketing, LLC d/b/a Big Frig*, Case: 1:16-cv-00699-RP, Document #11, Oct. 21, 2016, 8 pages.
United States District Court Western District of Texas Austin Division, "Complaint," *YETI Coolers, LLC v. Benner China and Glassware Florida, Inc.*, Case: 1:16-cv-00142-RP, Document #1, filed Feb. 16, 2016, 21 pages.
United States District Court Western District of Texas Austin Division, "Complaint," *YETI Coolers, LLC v. Blackbird Products Group, LLC, d/b/a Mammoth Coolers*, Case: 1:15-cv-01105, Document #1, filed Dec. 7, 2015, 266 pages.
United States District Court Western District of Texas Austin Division, "Complaint," *YETI Coolers, LLC v. Gametime Sidekicks, LLC*, Case 1:17-cv-00413, Document 1, filed May 5, 2017, 107 pages.
United States District Court Western District of Texas Austin Division, "Complaint," *YETI Coolers, LLC v. Glacier Coolers, LLC, and Tecomate Holdings, LLC*, Case 1:17-cv-00586, Document 1, filed Jun. 15, 2017, 161 pages.
United States District Court Western District of Texas Austin Division, "Complaint," *YETI Coolers, LLC v. Great American Products, Ltd.*, Case: 1:15-cv-00686, Document #1, filed Aug. 6, 2015, 20 pages.
United States District Court Western District of Texas Austin Division, "Complaint," *YETI Coolers, LLC v. Home Depot U.S.A., Inc., Takeya USA Corporation*, Case: 1:17-cv-00342, Document #1, filed Apr. 12, 2017, 24 pages.
United States District Court Western District of Texas Austin Division, "Complaint," *YETI Coolers, LLC v. Ideastage Promotions, LLC, d/b/a Swag Brokers*, Case: 1:15-cv-00774, Document #1, filed Sep. 2, 2015, 22 pages.
United States District Court Western District of Texas Austin Division, "Complaint," *YETI Coolers, LLC v. Imagen Brands, LLC, d/b/a Crown Products, and Ebsco Industries, Inc.*, Case: 1:16-cv-00578-RP, Document #1, filed May 16, 2016, 20 pages.
United States District Court Western District of Texas Austin Division, "Complaint," *YETI Coolers, LLC v. JDS Industries, Inc., Lionel Laundry Jr., d/b/a Accolades Awards & Engraving, Creating and Fast LLC d/b/a Promotional Products San Antonio, Kelly Scoggins d/b/a King Engraving, Jamey Z. Apps d/b/a Roberts Trophies, and Eagle Media, Inc.*, Case 1:17-cv-00424, Document 1, filed May 5, 2017, 62 pages.

United States District Court Western District of Texas Austin Division, "Complaint," *YETI Coolers, LLC v. Jennifer Leverne Bootz Evans d/b/a Bling and Burlap Buy in's and Blanks*, Case: 1:15-cv-00995, Document #1, filed Nov. 2, 2015, 128 pages.
United States District Court Western District of Texas Austin Division, "Complaint," *YETI Coolers, LLC v. Kaiser Group Inc., d/b/a Thermo Steel, d/b/a Vino2GO, d/b/a Brew2Go*, Case: 1:15-cv-00725, Document #1, filed Aug. 19, 2015, 21 pages.
United States District Court Western District of Texas Austin Division, "Complaint," *YETI Coolers, LLC v. Kodiak Coolers, LLC and Flexible Automation LLC*, Case 1:17-cv-00422, Document 1, filed May 5, 2017, 51 pages.
United States District Court Western District of Texas Austin Division, "Complaint," *YETI Coolers, LLC v. Kuer Outdoors, LLC*, Case: 1:16-cv-00631, Document #1, filed May 27, 2016, 89 pages.
United States District Court Western District of Texas Austin Division, "Complaint," *YETI Coolers, LLC v. Magnum Solace LLC*, Case: 1:16-cv-00663-RP, Document #1, filed Jun. 7, 2016, 24 pages.
United States District Court Western District of Texas Austin Division, "Complaint," *YETI Coolers, LLC v. MyCrew, LLC, MyCrew Drinkware, LLC and NNRiverLife, LLC*, Case: 1:16-cv-01008, Document #1, filed Aug. 26, 2016, 29 pages.
United States District Court Western District of Texas Austin Division, "Complaint," *YETI Coolers, LLC v. Polar Pad LLC, d/b/a Polar Pad Drifter, d/b/a Polar Pad, and Veterinary Internet Company, LLC, d/b/a VetInternetCo*, Case: 1:16-cv-00128, Document #1, Feb. 12, 2016, 24 pages.
United States District Court Western District of Texas Austin Division, "Complaint," *YETI Coolers, LLC v. Polar Pad LLC, d/b/a Polar Pad Drifter, d/b/a Polar Pad, and Veterinary Internet Company, LLC, d/b/a VetInternetCo*, Case: 1:16-cv-00677, Document #1, Jun. 10, 2016, 25 pages.
United States District Court Western District of Texas Austin Division, "Complaint," *YETI Coolers, LLC v. RTIC Coolers, LLC*, Case: 1:16-cv-00264, Document #1, filed Mar. 2, 2016, 34 pages.
United States District Court Western District of Texas Austin Division, "Complaint," *YETI Coolers, LLC v. Sam's West, Inc., and Sam's East, Inc.*, Case: 1:16-cv-00829, Document #1, Jun. 30, 2016, 21 pages.
United States District Court Western District of Texas Austin Division, "Complaint," *YETI Coolers, LLC v. Sic Products LLC, d/b/a Sic Cups, d/b/a Sic*, Case: 1:16-cv-00117-RP, Document #1, Feb. 4, 2016, 23 pages.
United States District Court Western District of Texas Austin Division, "Complaint," *YETI Coolers, LLC v. The Allen Company, d/b/a Allen Color Craft*, Case: 1:15-cv-00888-RP, Document #1, Oct. 6, 2015, 24 pages.
United States District Court Western District of Texas Austin Division, "Complaint," *YETI Coolers, LLC v. The Boelter Companies, Inc., Boelter Brands, LLC and Boelter Beverage, LLC*, Case: 1:16-cv-00456, Document #1, filed Apr. 8, 2016, 20 pages.
United States District Court Western District of Texas Austin Division, "Complaint," *YETI Coolers, LLC v. Titan Custom Products, Inc.*, Case: 1:15-cv-00775, Document #1, Sep. 2, 2015, 22 pages.
United States District Court Western District of Texas Austin Division, "Complaint," *YETI Coolers, LLC v. Tree Leaf Marketing, LLC d/b/a Big Frig*, Case: 1:16-cv-00699, Document #1, Jun. 17, 2016, 33 pages.
United States District Court Western District of Texas Austin Division, "Complaint," *YETI Coolers, LLC v. US Imprints, LLC, d/b/a GOimprints*, Case: 1:15-cv-00773, Document #1, Sep. 2, 2015, 22 pages.
United States District Court Western District of Texas Austin Division, "Complaint," *YETI Coolers, LLC v. Vickery Products, LLC d/b/a Axis Cups, f/d/b/a Frio Cups*, Case: 1:17-cv-00260, Document #1, Mar. 24, 2017, 52 pages.
United States District Court Western District of Texas Austin Division, "Complaint," *YETI Coolers, LLC v. Wadley Holdings, LLC d/b/a Meadowcraft, and Southern Sales & Marketing Group, Inc. d/b/a/ nICE*, Case 1:17-cv-00421, Document 1, filed May 5, 2017, 121 pages.

(56) References Cited

OTHER PUBLICATIONS

United States District Court Western District of Texas Austin Division, "Complaint," *YETI Coolers, LLC* v. *Wal-Mart Stores, Inc.*, Case: 1:16-cv-00454, Document #1, Apr. 8, 2016, 29 pages.
United States District Court Western District of Texas Austin Division, "Consent Judgment," *YETI Coolers, LLC* v. *The Boelter Companies, Inc., Boelter Brands, LLC and Boelter Beverage, LLC*, Case: 1:16-cv-00456-RP, Document #25, filed Sep. 13, 2016, 3 pages.
United States District Court Western District of Texas Austin Division, "Defendant Blackbird Products Group, LLC's Answer and Affirmative Defenses to Plaintiff Yeti Coolers, LLC's Complaint," *YETI Coolers, LLC* v. *Blackbird Products Group, LLC, d/b/a Mammoth Coolers*, Case: 1:15-cv-01105-SS, Document #13, filed Dec. 28, 2015, 11 pages.
United States District Court Western District of Texas Austin Division, "Defendant Kaiser Group Inc.'s Answer, Affirmative Defenses, and Counterclaims to Plaintiff YETI Coolers, LLC's Complaint," *YETI Coolers, LLC* v. *Kaiser Group Inc., d/b/a Thermo Steel, d/b/a Vino2Go, d/b/a Brew2GO*, Case: 1:15-cv-00725-RP, Document #14, filed Oct. 13, 2015, 65 pages.
United States District Court Western District of Texas Austin Division, "Defendant RTIC Drinkware, LLC, RTIC Web Services, LLC, Corporate Support & Fulfillment, LLC, John Jacobsen, and James Jacobsen's Answer and Counterclaims to YETI's First Amended Complaint for Damages and Injunctive Relief," *YETI Coolers, LLC* v. *RTIC Coolers, LLC, RTIC Drinkware, LLC, RTIC Web Services, LLC, Corporate Support & Fulfillment, LLC; John Jacobsen; and James Jacobsen*, Case: 1:16-cv-00264-RP, Document #25, filed Jun. 13, 2016, 42 pages.
United States District Court Western District of Texas Austin Division, "Defendant's Answer to Plaintiffs Complaint and Affirmative Defenses," *YETI Coolers, LLC* v. *MyCrew, LLC, MyCrew Drinkware, LLC and NNRiverLife, LLC*, Case: 1:16-cv-01008-RP, Document #14, filed Nov. 29, 2016, 12 pages.
United States District Court Western District of Texas Austin Division, "Defendant's Answer," *YETI Coolers, LLC* v. *Magnum Solace LLC*, Case: 1:16-cv-00663-RP, Document #34, filed Apr. 13, 2017, 7 pages.
United States District Court Western District of Texas Austin Division, "Defendant's Rule 12(B)(6) Motion to Dismiss For Failure to State a Claim," *YETI Coolers, LLC* v. *Magnum Solace LLC*, Case: 1:16-cv-00663-RP, Document #10, 'filed Aug. 5, 2016, 30 pages.
United States District Court Western District of Texas Austin Division, "Defendants Sam's West, Inc. and Sam's East, Inc.'s Answer to Complaint," *YETI Coolers, LLC* v. *Sam's West, Inc., and Sam's East, Inc.*, Case: 1:16-cv-00829-RP, Document #16, filed Aug. 26, 2016, 11 pages.
United States District Court Western District of Texas Austin Division, "Defendants' Answer to Complaint," *YETI Coolers, LLC* v. *The Boelter Companies, Inc., Boelter Brands, LLC and Boelter Beverage, LLC*, Case: 1:16-cv-00456-RP, Document #21, filed Jun. 7, 2016, 9 pages.
United States District Court Western District of Texas Austin Division, "First Amended Complaint," *YETI Coolers, LLC* v. *Sam's West, Inc., and Sam's East, Inc.*, Case: 1:16-cv-00829-RP, Document #32, filed Jan. 9, 2017, 24 pages.
United States District Court Western District of Texas Austin Division, "First Amended Complaint," *YETI Coolers, LLC* v. *Sic Products LLC, d/b/a Sic Cups, d/b/a Sic*, Case: 1:16-cv-00117-RP, Document #34, Nov. 21, 2016, 25 pages.
United States District Court Western District of Texas Austin Division, "First Amended Complaint," *YETI Coolers, LLC* v. *Wal-Mart Stores, Inc. and Olympia Tools International, Inc.*, Case: 1:16-cv-00454-RP, Document #17, May 24, 2016, 26 pages.
United States District Court Western District of Texas Austin Division, "Olympia Tools International, Inc.'s Answer to YETI Coolers, LLC's First Amended Complaint," *YETI Coolers, LLC* v. *Wal-Mart Stores, Inc. and Olympia Tools International, Inc.*, Case: 1:16-cv-00454-RP, Document #28, Jul. 14, 2016, 12 pages.
United States District Court Western District of Texas Austin Division, "Order," *RTIC Drinkware, LLC* v. *YETI Coolers, LLC*, Case: 1:16-cv-00907-RP, Document #47, filed Oct. 13, 2016, 3 pages.
United States District Court Western District of Texas Austin Division, "Order," *YETI Coolers, LLC* v. *Blackbird Products Group, LLC, d/b/a Mammoth Coolers*, Case: 1:15-cv-01105-RP, Document #26, filed Apr. 20, 2016, 1 page.
United States District Court Western District of Texas Austin Division, "Order," *YETI Coolers, LLC* v. *Great American Products, Ltd.*, Case: 1:15-cv-00686-RP, Document #25, filed Mar. 14, 2016, 1 page.
United States District Court Western District of Texas Austin Division, "Order," *YETI Coolers, LLC* v. *Ideastage Promotions, LLC, d/b/a Swag Brokers*, Case: 1:15-cv-00774-RP, Document #19, filed Dec. 21, 2015, 1 page.
United States District Court Western District of Texas Austin Division, "Order," *YETI Coolers, LLC* v. *Jennifer Leverne Bootz Evans d/b/a Bling and Burlap Buy In's and Blanks*, Case: 1:15-cv-00995-RP, Document #18, filed Apr. 18, 2016, 1 page.
United States District Court Western District of Texas Austin Division, "Order," *YETI Coolers, LLC* v. *Polar Pad LLC, d/b/a Polar Pad Drifter, d/b/a Polar Pad, and Veterinary Internet Company, LLC, d/b/a VetInternetCo*, Case: 1:16-cv-00128-RP, Document #17, Jun. 17, 2016, 1 page.
United States District Court Western District of Texas Austin Division, "Order," *YETI Coolers, LLC* v. *US Imprints, LLC, d/b/a GOimprints*, Case: 1:15-cv-00773-RP, Document #23, Apr. 25, 2016, 1 page.
United States District Court Western District of Texas Austin Division, "Plaintiff YETI Coolers, LLC's Original Complaint," *YETI Coolers, LLC* v. *Ontel Products Corporation and World Pack USA, LLC*, Case: 1:17-cv-00091-RP, Document #1, filed Feb. 8, 2017, 65 pages.
United States District Court Western District of Texas Austin Division, "RTIC Drinkware's First Amended Complaint for Declaratory Judgment," *RTIC Drinkware, LLC* v. *YETI Coolers, LLC*, Case: 1:16-cv-00907-RP, Document #52, filed Nov. 14, 2016, 124 pages.
United States District Court Western District of Texas Austin Division, "Sic Products, LLC's Answer, Affirmative Defenses, and Counterclaims to Plaintiff's Amended Complaint," *YETI Coolers, LLC* v. *Sic Products LLC, d/b/a Sic Cups, d/b/a Sic*, Case: 1:16-cv-00117-RP, Document #35, Dec. 5, 2016, 81 pages.
United States District Court Western District of Texas Austin Division, "Sic Products, LLC's Answer, Affirmative Defenses, and Counterclaims to Plaintiff's Complaint," *YETI Coolers, LLC* v. *Sic Products LLC, d/b/a Sic Cups, d/b/a Sic*, Case: 1:16-cv-00117-RP, Document #14, Jun. 3, 2016, 38 pages.
United States District Court Western District of Texas Austin Division, "Veterinary Internet Company, LLC d/b/a VetInternetCo's Answer to Plaintiff's Complaint," *YETI Coolers, LLC* v. *Polar Pad LLC, d/b/a Polar Drifter, d/b/a Polar Pad, and Veterinary Internet Company, LLC, d/b/a VetInternetCo*, Case: 1:16-cv-00677-RP, Document #11, Aug. 19, 2016, 12 pages.
United States District Court Western District of Texas Austin Division, "Wal-Mart Stores, Inc.'s Answer to First Amended Complaint," *YETI Coolers, LLC* v. *Wal-Mart Stores, Inc. and Olympia Tools International, Inc.*, Case: 1:16-cv-00454-RP, Document #22, Jun. 7, 2016, 13 pages.
United States District Court Western District of Texas Austin Division, "YETI Coolers, LLC's Answer to RTIC Drinkware LLC's Complaint," *RTIC Drinkware, LLC* v. *YETI Coolers, LLC*, Case: 1:16-cv-00907-RP, Document #35, filed Aug. 9, 2016, 27 pages.
United States District Court Western District of Texas Austin Division, "YETI Coolers, LLC's Answer to RTIC Drinkware's First Amended Complaint," *RTIC Drinkware, LLC* v. *YETI Coolers, LLC*, Case: 1:16-cv-00907-RP, Document #58, filed Dec. 1, 2016, 15 pages.
United States District Court Western District of Texas Austin Division, "YETI Coolers, LLC's Answer to RTIC Drinkware,

(56) References Cited

OTHER PUBLICATIONS

LLC's, RTIC Web Services, LLC's, Corporate Support & Fulfillment, LLC's, John Jacobsen's, and James Jacobsen's Counterclaims," *YETI Coolers, LLC v. RTIC Coolers, LLC, RTIC Drinkware, LLC, RTIC Web Services, LLC, Corporate Support & Fulfillment, LLC, John Jacobsen, and James Jacobsen,* Case: 1:16-cv-00264-RP, Document #31, filed Jul. 7, 2016, 7 pages.
United States District Court Western District of Texas Austin Division, "YETI Coolers, LLC's Answer to SIC Products, LLC Counterclaims to YETI Coolers, LLC's Amended Complaint," *YETI Coolers, LLC v. Sic Products LLC, d/b/a Sic cups, d/b/a Sic,* Case: 1:16-cv-00117-RP, Document #38, Dec. 19, 2016, 20 pages.
United States District Court Western District of Texas Austin Division, "YETI Coolers, LLC's Answer to SIC Products, LLC Counterclaims," *YETI Coolers, LLC v. Sic Products LLC, d/b/a Sic Cups, d/b/a Sic,* Case: 1:16-cv-00117-RP, Document #21, Sep. 29, 2016, 15 pages.
United States District Court Western District of Texas Austin Division, "YETI Coolers, LLC's First Amended Complaint," *YETI Coolers, LLC v. RTIC Coolers, LLC, RTIC Drinkware, LLC, RTIC Web Services, LLC, Corporate Support & Fulfillment, LLC, John Jacobsen, and James Jacobsen,* Case: 1:16-cv-00264-RP, Document #15, filed May 16, 2016, 110 pages.
"New 16oz Insulated Coffee Travel Mug Stainless Steel Double Wall Thermos Tumbler", retrieved from <http://www.ebay.com/itm/New-16oz-Insulated-COFFEE-TRAVEL-MUG-Stainless-Steel-Double-Wall-Thermos-Tumbler-/171416296921> on Aug. 27, 2015.
"Osulloc Green Cup," retrieved from http://www.edaymall.com/display/goods.do?media_code=E06&goods_code=10183708 on Sep. 6, 2016.
"Stainless Steel Travel Mug with Slide Action Lid and Plastic Inner Liner—16oz.", retrieved from <http://waterbottles.com/stainless-steel-travel-mug-with-slide-action-lid-and-plastic-inner-liner-16-oz> on Aug. 27, 2015.
"YETI Rambler 20 and 30 oz", published on Apr. 19, 2014, retrieved from https://web.archive.org/web/20140419041951/http://yeticoolers.com/rambler-tumblers/ on Sep. 2, 2015.
Dec. 14, 2016 (PCT) International Search Report and Written Opinion—App PCT/US2016/055491.
May 24, 2017—(WO) International Search Report and Written Opinion—App. No. PCT/US2017/022315—16 pages.
Eshine Industrial & Maoyuan International, "400ml Double Wall Stainless Steel Travel Mug with Sliding Drink Lid", retrieved from <http://www.chinawaterbottle.com/product/400ml-double-wall-stainless-steel-travel-mug-with-sliding-drink-lid-77-520.html> on Aug. 27, 2015.
Gold Bond Inc., "16CT—16 oz Cafe Tumbler", retrieved from <http://www.goldbondinc.com/16ct> on Aug. 27, 2015.
Hit Promotional Products, "24 Oz. Biggie Tumbler with Lid", retrieved from <http://www.hitpromo.net/product/show/5853/24-oz-biggie-tumbler-with-lid> on Aug. 27, 2015.
Photo USA Electronic Graphic Inc., "17fl oz Personalised Travel Mug (Plastic Insert and Metal Shell, Reverse Screw)", retrieved from <http://www.meikeda.com/stainless-steel-mug/item/15-oz-personalised-travel-mug.html> on Aug. 27, 2015.
Photographic image of YETI 20oz Rambler Tumbler, published date unknown, but prior to the filing date of the present application.
Photographic image of YETI 30oz Rambler Tumbler, published date unknown, but prior to the filing date of the present application.
Pictures of Great American Products Tumbler, published date unknown, but prior to the filing date of the present application.
Promo Industrial Co., Limited, "16 Oz. Blue Bullet Travel Mug W/ Handle", retrieved from <http://www.oempromo.com/Bottle-cup-and-mug/Mugs/index_73.htm> on Aug. 27, 2015.
Promotional Items, Inc., "Stainless Steel 14oz. Deluxe Coffee Insulated Tumbler Lid", retrieved from <http://www.promotional-items-inc.com/catalog/stainless_steel_18oz_commuter_coffee_mug_lid.html> on Aug. 27, 2015.
Second photographic image of YETI 30oz Rambler Tumbler, published date unknown, but prior to the filing date of the present application.
The Alexon Group, "16 Oz. Stainless Steel Travel Mug with Slide Action Lid and Plastic Inner Liner", retrieved from <https://alexongroup.com/16-oz-stainless-steel-travel-mug-with-slide-action-lid-and-plastic-inner-liner> on Aug. 27, 2015.
The Product Farm, "BeerNStein Rocks Tumbler Lid—Blue", retrieved from<http://store.theproductfarm.com/beernstein-rocks-tumbler-lid-blue/> on Aug. 27, 2015.
Timolino, "Signature Thermal Travel Mug Slide-Tab Lid", retrieved from <http://timolino.com/products/signature-thermal-travel-mug-slide-tab-lid> on Aug. 27, 2015.
United States District Court Western District of Texas Austin Division, "Complaint," *YETI Coolers, LLC v. Bayou Ice Boxes, Inc.,* Case: 1:17-cv-00261, Document #1, filed Mar. 24, 2017, 41 pages.
United States District Court Western District of Texas Austin Division, "Complaint," *YETI Coolers, LLC v. Godinger Silver Art, Ltd., Cathy's Concepts, Inc., Viatek Consumer Products Group, Inc.,* Case: 1:17-cv-00467, Document #1, filed May 16, 2017, 22 pages.
United States District Court Western District of Texas Austin Division, "Complaint," *YETI Coolers, LLC v. Gourmet Home Products, LLC,* Case: 1:17-cv-00533, Document #1, filed Jun. 2, 2017, 25 pages.
United States District Court Western District of Texas Austin Division, "Complaint," *YETI Coolers, LLC v. Vickery Products, LLC d/b/a Axis Cups, f/d/b/a Frio Cups,* Case: 1:17-cv-00260, Document #1, filed Mar. 24, 2017, 52 pages.
Vat19, "16 oz. Dual Auto/USB Heated Mug", retrieved from <https://www.vat19.com/item/16-oz-dual-auto-usb-heater-coffee-mug> on Aug. 27, 2015.
United States District Court Western District of Texas Austin Division, "Complaint" *YETI Coolers, LLC v. Zhejiang Zhuosheng Industry & Trade Co, Ltd.,* d/b/a Wuyi Zhuosheng Household Metal Products Co., Ltd., d/b/a Yongkang lhuosheng Metal Products Products Co., Ltd., d/b/a Zhejiang Zhuosheng Industry & Trade Co, Ltd., Case 1:17-cv-00821, Document 1, filed Aug. 23, 2017, 27 pages.
United States District Court Western District of Texas Austin Division, "Plaintiffs' Complaint for Damages and Injunctive Relief," *YETI Coolers, LLC v. Houssam Rabid/b/a Hoo-Sizzy,* Case 1:17-cv-00418, Document 1, filed May 5, 2017, 37 pages.
United States District Court Western District of Texas Austin Division, "Plaintiffs' Complaint for Damages and Injunctive Relief," *YETI Coolers, LLC v. Seth Stevensd/b/a SDS Marketing d/b/a Eskimo Coolers, Panther Group LLC d/b/a Eskimo Coolers, Panther Group Sales, LLC d/b/a Eskimo Coolers, and Silver Fox Sales, LLC,* Case 1:17-cv-00423, Document 1, filed May 5, 2017, 77 pages.

\* cited by examiner

CONTAINER AND HANDLE AND METHOD OF FORMING A CONTAINER AND HANDLE

CROSS-REFERENCE TO RELATED APPLICATIONS

This patent application claims the benefit of U.S. Provisional Patent Application No. 62/255,886 filed Nov. 16, 2015, entitled Container and Method of Forming a Container, and U.S. Provisional Patent Application No. 62/237,419, filed Oct. 5, 2015, entitled Container and Method of Forming a Container each of which are incorporated by reference herein in their entirety.

FIELD

The present disclosure herein relates broadly to containers, and more specifically to handles for drinkware containers used for drinkable beverages or foods.

BACKGROUND

A container may be configured to store a volume of liquid. Containers can be filled with hot or cold drinkable liquids, such as water, coffee, tea, soft drink, or alcoholic beverage, such as beer. These containers can be formed of a double-wall vacuumed formed construction to provide insulative properties to help maintain the temperature of the liquid within the container. Handles may be engaged such containers. These handles may be removable or may be permanently engaged with the container.

BRIEF SUMMARY

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

Aspects of the disclosure herein relate to containers and handles for containers. In certain examples, this disclosure provides a handle for removably engaging a container. The handle may include a ring portion for engaging an outer shell of the container, the ring portion having a top edge and a bottom edge, the ring portion also including an upper ridge extending along an upper portion of the ring portion and lower ridge extending around a lower portion of the ring portion; a handle portion engaged with the ring portion, the handle portion including a lengthwise depression; and an engagement layer disposed on an inner surface of the ring portion. The ring portion and the handle portion may be comprised of a first material, and the first material may have a thermal conductivity of about 0.1 W/(m*K) to about 0.22 W/(m*K). The engagement layer may be comprised of a second material. The first material and the second material may be different materials. The top edge of the ring portion may have a diameter that is greater than a diameter of the bottom edge of the ring portion. The handle may include a lower portion that curves or angles inward toward the container.

The ring portion of the ring portion may have a height of about 0.71 inches to about 0.79 inches; a width of about 0.76 inches to about 0.84 inches; a depth of about 0.58 inches to about 0.64 inches; and a height about 3.90 inches to about 4.31 inches.

The handle may also include a base portion engaged with the lower portion of the handle, the base portion having an annular wall, the annular wall including a sidewall portion which forms a ring around the container and a bottom portion which is disposed below the container. The bottom portion of the base portion may include an aperture. The inside surface of the base portion may contain a second engagement layer, and the second engagement layer may be comprised of the second material. The total height of the handle may be about 3.55 inches to about 3.93 inches.

In another example, an insulating container is disclosed. The insulating container may include an inner wall extending into an internal reservoir for receiving liquid; an outer wall forming an outer shell of the container, the second outer wall having second end configured to support the container on a surface; a sealed vacuum cavity forming an insulated double wall structure between the inner wall and the outer wall, the insulating container having a top end; and a removably engaged handle. The handle may include a ring portion for engaging the outer shell of the container, the ring portion having a top edge and a bottom edge; and a handle portion engaged with the ring portion, the handle having a height.

The ring portion of the handle may a height of about 0.71 inches to about 0.79 inches. The handle may have a width of about 0.76 inches to about 0.84 inches. The handle may have a depth of about 0.58 inches to about 0.64 inches. The handle may have a height of about 3.90 inches to about 4.31 inches. The distance between the top end of the container and the top edge of the ring portion may be between about 0.75 inches to about 1.50 inches.

The first wall and the second wall may be comprised of a first material; and the removably engaged handle may be comprised of a second material. The first material may have a first thermal conductivity and the second material may have a second thermal conductivity, and the thermal conductivity of the first material may be greater than the thermal conductivity of the second material. The ratio of the thermal conductivity of the first material to the thermal conductivity of the second material may be between about 85 and about 160.

The handle may also include an engagement layer disposed between the ring portion and the outer wall. The engagement layer may be comprised of a third material.

The top edge of the ring portion may have a diameter that is greater than a diameter of the bottom edge of the ring portion.

The removably engaged handle may include a lower portion that curves or angles inward toward the container. The handle may also include a base portion engaged with the lower portion of the handle, the base portion having an annular wall, wherein the base portion includes a sidewall portion which forms a ring around the container, and a bottom portion which is disposed below the container. The bottom portion of the base portion may contain an aperture. An inside surface of the base portion may contain a second engagement layer, and the second engagement layer may be comprised of the third material.

In another example, a container kit is disclosed. The container kit may include a first container having a top end and a base and a first container height defined between the top end and the base. The first container may include an inner wall extending into an internal reservoir for receiving liquid; an outer wall forming an outer shell of the container; a sealed vacuum cavity forming an insulated double wall structure between the inner wall and the outer wall; and a first handle removably engaged with the first container. The first handle may include a first handle ring portion for engaging the outer shell of the first container, the ring having a top edge defining a top diameter and a bottom edge defining a bottom diameter; and a first handle handle portion engaged with the ring portion, the first handle having a first handle height; a first engagement layer disposed on an inner surface of the first handle ring portion. The kit may also include a second container having a top end and a base and a second container height defined between the top end and the base. The second container my include an inner wall extending into an internal reservoir for receiving liquid; an outer wall forming an outer shell of the container; and a sealed vacuum cavity forming an insulated double wall structure between the inner wall and the outer wall; and a second handle removably engaged with the second container. The second handle may include a second handle ring portion for engaging the outer shell of the second container, the ring having a top edge defining a top diameter and a bottom edge defining a bottom diameter; and a second handle handle portion engaged with the second handle ring portion, the second handle having a second handle height; a second engagement layer disposed on an inner surface of the second handle ring portion. The first container height may be different than the second container height.

The first container and the second container may be comprised of a first material and the first handle and the second handle are comprised of a second material. The ratio of thermal conductivity of the first material to the thermal conductivity of the second material is between about 85 and about 160.

The upper diameter of the first handle may be greater than the lower diameter of the first handle, and the upper diameter of the second handle may be greater than the lower diameter of the second handle.

Each of the first and second ring portions may include an upper ridge extending along an upper portion of the ring portion and lower ridge extending around a lower portion of the ring portion. Each of the first and second handle portions include a lengthwise depression.

The first and second ring portions each may have a height of about 0.71 inches to about 0.79 inches. The first and second handle portions each may have a handle width of about 0.76 inches to about 0.84 inches. The first and second handle portions each may have a handle depth of about 0.58 inches to about 0.64 inches. The first and second handles each may have a handle height of about 3.90 inches to about 4.31 inches.

The distance between the top end of the first container and the top edge of the first handle ring portion may be substantially the same as the distance between the top end of the second container and the top edge of the second handle ring portion.

The first and second handles may include a lower portion that curves or angles inward toward the container. The second handle further include a base portion engaged with the lower portion of the second handle, the base portion having an annular wall, the annular wall including a sidewall portion which forms a ring around the container and a bottom portion which is disposed below the container. The bottom portion of the base portion may contain an aperture; and an inside surface of the base portion may contain a second engagement layer.

BRIEF DESCRIPTION OF THE DRAWINGS

The present disclosure is illustrated by way of example and not limited in the accompanying figures in which like reference numerals indicate similar elements and in which.

Further, it is to be understood that the drawings may represent the scale of different components of various examples; however, the disclosed examples are not limited to that particular scale.

DETAILED DESCRIPTION

In the following description of the various examples, reference is made to the accompanying drawings, which form a part hereof, and in which is shown by way of illustration various examples in which aspects of the disclosure may be practiced. It is to be understood that other examples may be utilized and structural and functional modifications may be made without departing from the scope and spirit of the present disclosure.

Also, while the terms "top," "bottom," "front," "back," "side," "rear," "upward," "downward," and the like may be used in this specification to describe various example features and elements of the disclosure, these terms are used herein as a matter of convenience, e.g., based on the example orientations shown in the figures or the orientation during typical use. Additionally, the term "plurality," as used herein, indicates any number greater than one, either disjunctively or conjunctively, as necessary, up to an infinite number. Nothing in this specification should be construed as requiring a specific three dimensional orientation of structures in order to fall within the scope of this disclosure. Also, the reader is advised that the attached drawings are not necessarily drawn to scale.

In general, aspects of this disclosure relate to systems of containers and handles. According to various aspects and embodiments, the containers and/or handles may be formed of one or more of a variety of materials, such as metals (including metal alloys), plastics, polymers, and composites, and may be formed in one of a variety of configurations, without departing from the scope of the disclosure.

The various figures in this application illustrate examples of drinkware containers and handles according to this disclosure. When the same reference number appears in more than one drawing, that reference number is used consistently in this specification and the drawings to refer to the same or similar parts throughout.

Figure 1:
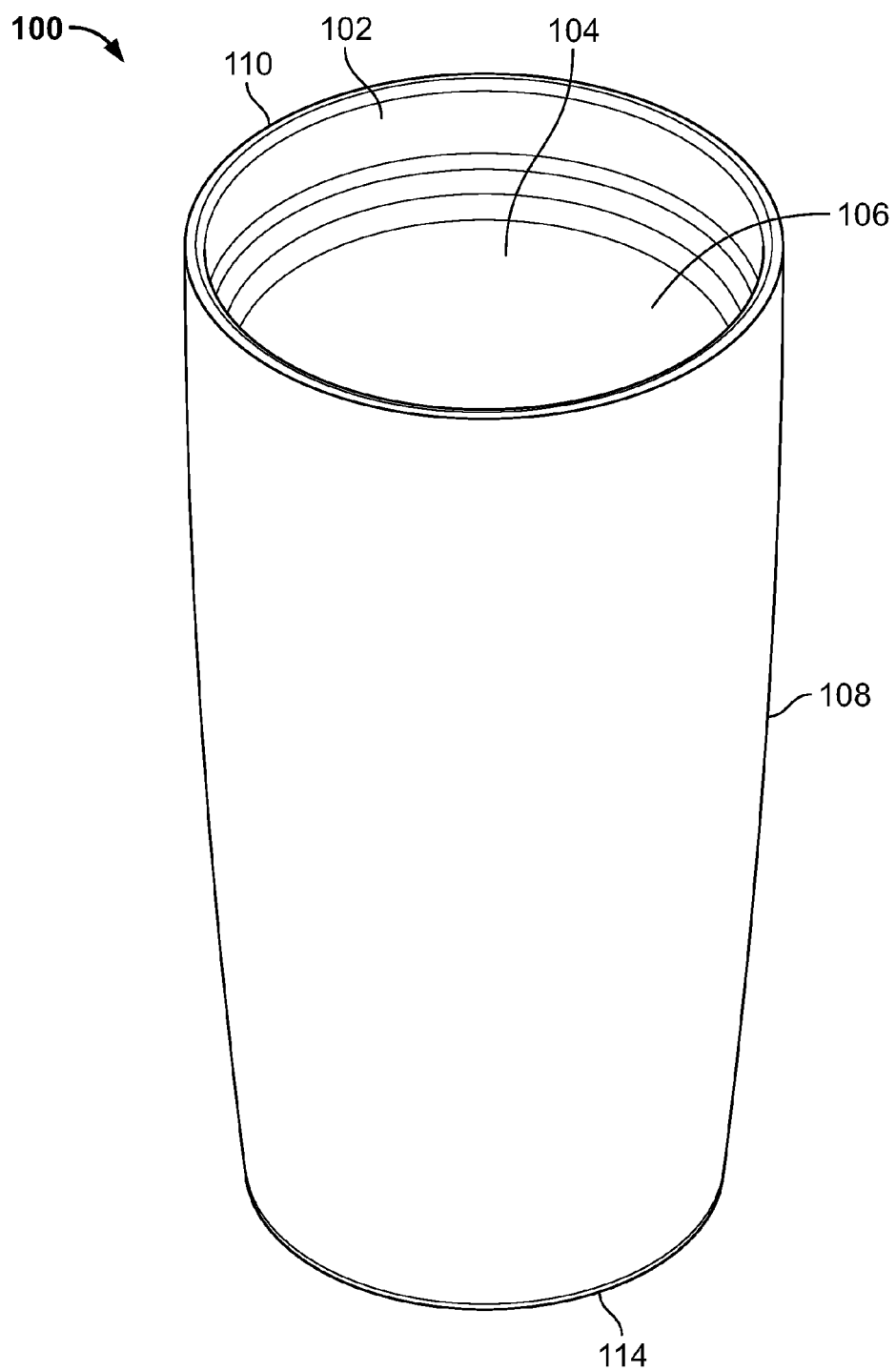
FIG. 1 depicts an isometric view of an example container, according to one or more aspects described herein.

Aspects of this disclosure relate to a container or tumbler configured to store a volume of liquid. FIG. 1 depicts an isometric view of an insulating container 100. In one example, the container 100 may be configured to store a volume of liquid. The container 100 generally includes a top portion having an opening 102 and an internal reservoir 104 for storing a liquid. In some embodiments, the container 100 may be configured to hold approximately 20 oz of liquid.

The container 100 includes an inner wall 106 and an outer wall 108. The inner wall 106 and the outer wall 108 may form a sealed vacuum cavity between the inner wall 106 and the outer wall 108 to form an insulated double-wall structure. As shown in FIG. 1, the outer wall 108 may be tapered, however, in other embodiments the outer wall may be substantially straight.

The container 100 has a top end 110 which defines the opening 102 into the internal reservoir 104 for receiving liquid. The container 100 also has a bottom portion or base 114 to support the container on a surface.

The container 100, including the inner wall 106, the outer wall 108 and the base 114, can be formed of either titanium or stainless steel and various alloys thereof. However, other suitable materials are contemplated including for example, other metals, alloys, plastics, polymers, and composites.

Figure 2:
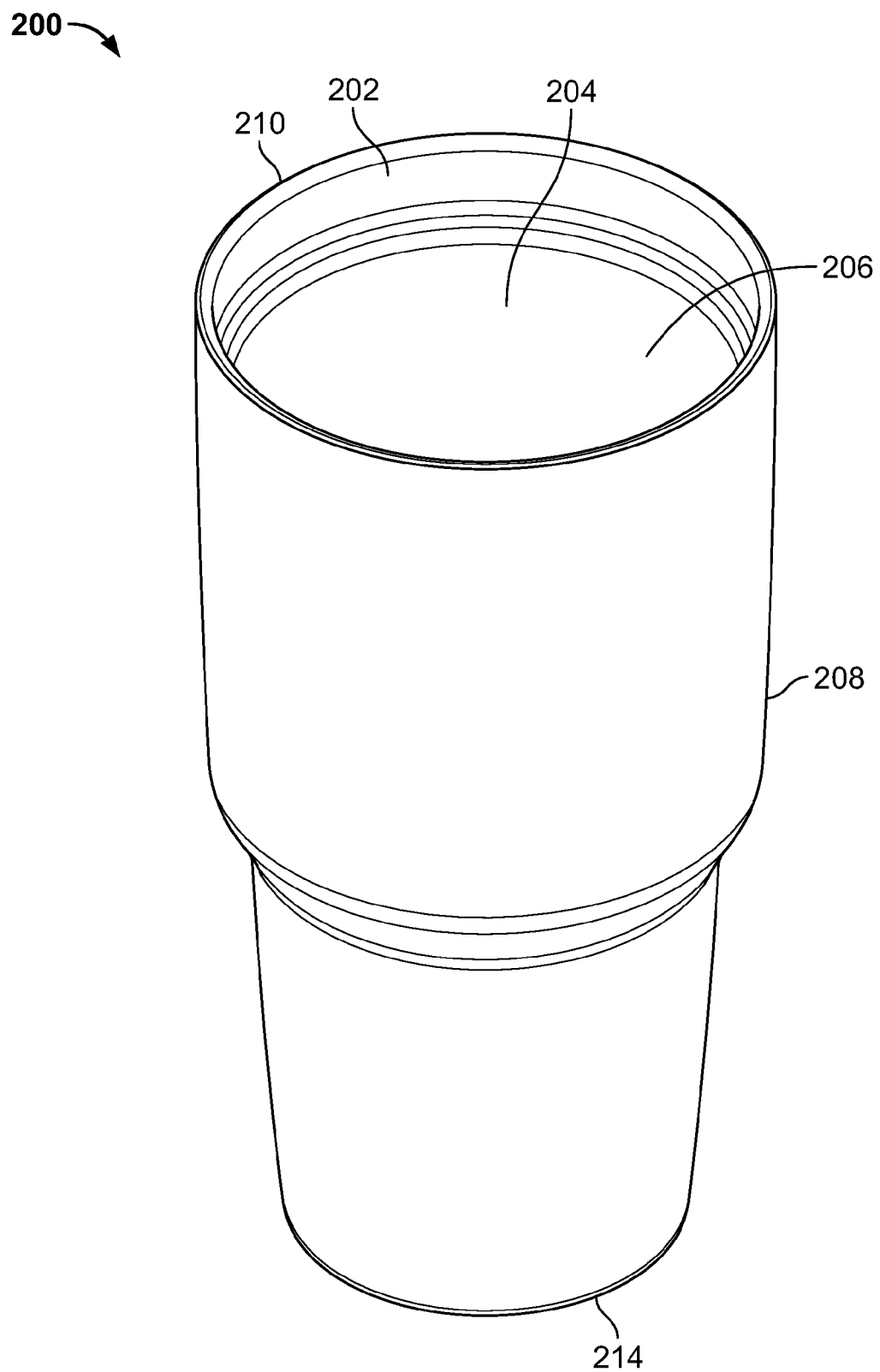
FIG. 2 depicts an isometric view of an example container, according to one or more aspects described herein.

Similar to the above example, FIG. 2 depicts an isometric view of another insulating container 200 which may be configured to store a volume of liquid. In some embodiments, the container 200 may be configured to hold approximately 30 oz of liquid. The container 200 generally includes a top portion having an opening 202 and an internal reservoir 204 for storing a liquid. The container 200 similarly includes an inner wall 206 and an outer wall 208. The inner wall 206 and the outer wall 208 may form a sealed vacuum cavity between the inner wall 106 and the outer wall 208 to form an insulated double-wall structure. As shown in FIG. 2, the outer wall 208 may be tapered, however, in other embodiments the outer wall may be substantially straight.

The container 200 also has a top end 210 which defines the opening 202 into the internal reservoir 204 for receiving liquid. The container 200 also has a bottom portion or base 214 to support the container on a surface. The container 200, including the inner wall 206, the outer wall 208 and the base 214, can be formed of either titanium or stainless steel and various alloys thereof. However, other suitable materials are contemplated including for example, other metals, alloys, plastics, polymers, and composites.

Figure 3:
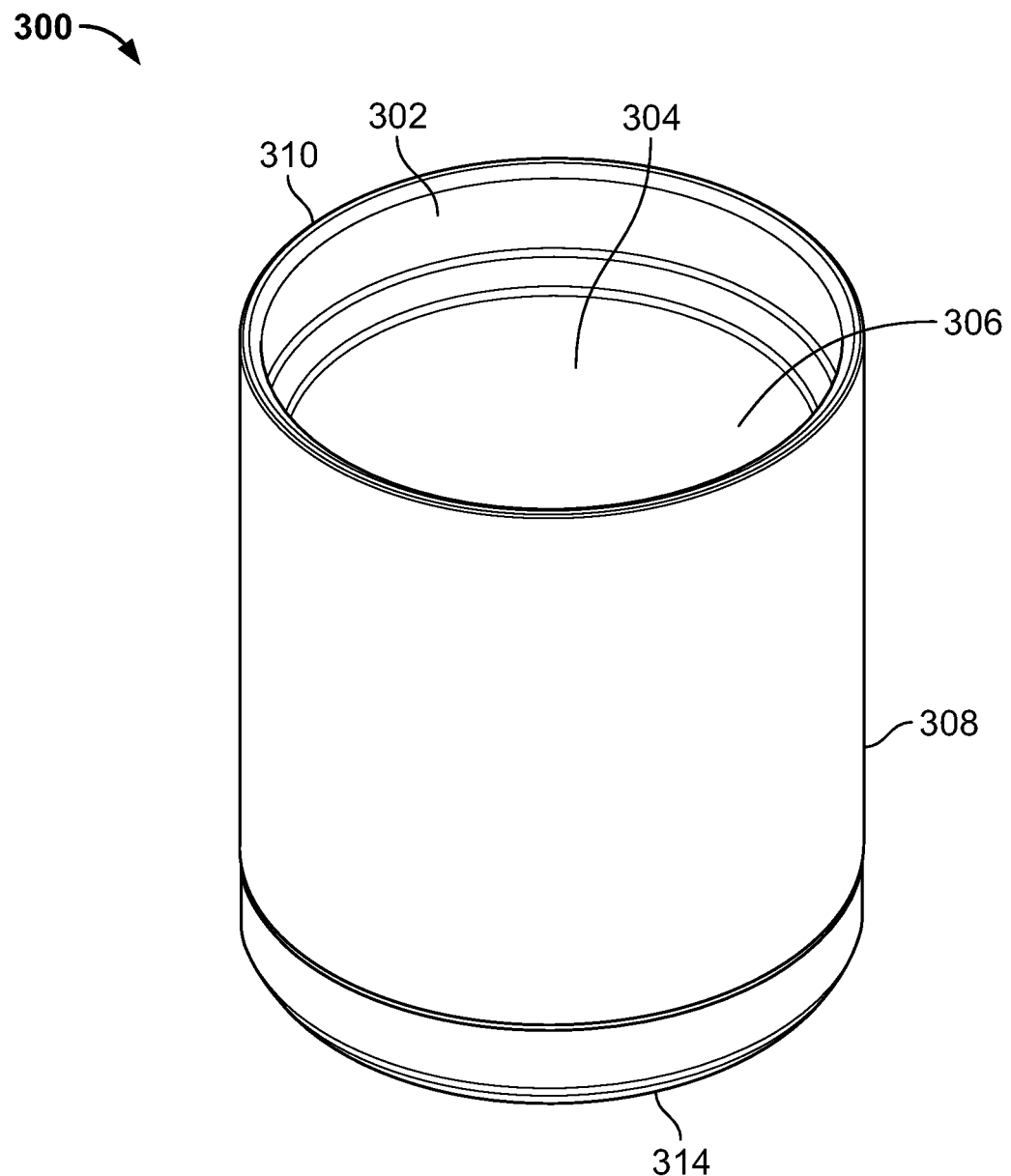
FIG. 3 depicts an isometric view of an example container, according to one or more aspects described herein.

Similar to the above examples, FIG. 3 depicts an isometric view of another insulating container 300 which may be configured to store a volume of liquid. In some embodiments, the container 300 may be configured to hold approximately 10 oz of liquid. The container 300 generally includes a top portion having an opening 302 and an internal reservoir 304 for storing a liquid. The container 300 similarly includes an inner wall 306 and an outer wall 308. The inner wall 306 and the outer wall 308 may form a sealed vacuum cavity between the inner wall 306 and the outer wall 308 to form an insulated double-wall structure. The outer wall 308 may be tapered or may be substantially straight.

The container 300 also has a top end 310 which defines the opening 302 into the internal reservoir 304 for receiving liquid. The container 300 also has a bottom portion or base 314 to support the container on a surface. The container 300, including the inner wall 306, the outer wall 308 and the base 314, can be formed of either titanium or stainless steel and various alloys thereof. However, other suitable materials are contemplated including for example, other metals, alloys, plastics, polymers, and composites.

It is also contemplated that the containers 100, 200, 300 can include insulated lids for preventing spills and/or heat transfer to or from liquids stored within the containers 100, 200, 300. The lids can include a gasket and/or threads and may also be configured to be selectively opened by the user. For example, the containers 100, 200, 300 can be configured to receive the lids described in U.S. application Ser. Nos. 14/971,779 and 14/971,788, which are fully incorporated herein by reference. In certain examples and as discussed herein, the containers 100, 200, 300 may be constructed from one or more metals, alloys, polymers, ceramics, or fiber-reinforced materials. Additionally, the containers 100, 200, 300 may be constructed using one or more hot or cold working processes (e.g. stamping, casting, molding, drilling, grinding, forging, among others). For example, the inner walls 106, 206, 306 and the outer walls 108, 208, 308 can be formed as single sheets of material and rolled into cylinders and welded together at a seam. The seam can be polished such that the welded portions are not visible to the user. In one implementation, the containers 100, 200, 300 may be constructed using a stainless steel. In one specific example, the container 100, 200, 300 may be formed substantially of 304 stainless steel. In another implementation, the containers 100, 200, 300 may be constructed using titanium or a titanium alloy.

Referring now to FIGS. 4-21, the containers 100, 200, 300 may include a handle 400 (shown generally in FIGS. 4-9), 500 (shown generally in FIGS. 10-15) and 600 (shown generally in FIGS. 16-21). As shown in FIGS. 4-21, the handles 300, 400, 500 may be removably engaged with containers 100, 200, 300. However, in other embodiments the handles 400, 500, 600, may be integrally formed and/or permanently engaged with the containers 100, 200, 300. The handles 400, 500, 600 may be made of various materials, such as metals (including metal alloys), plastics, polymers, and composites. More specific example materials may include rubber, plastics, elastomers, thermoplastic elastomers (TPE), and polypropylene (PP), stainless steel, and titanium (titanium alloys). Additionally, as will be discussed in more detail below the handles may include multiple different materials connected to or formed over different portions of the handle.

Figure 4:
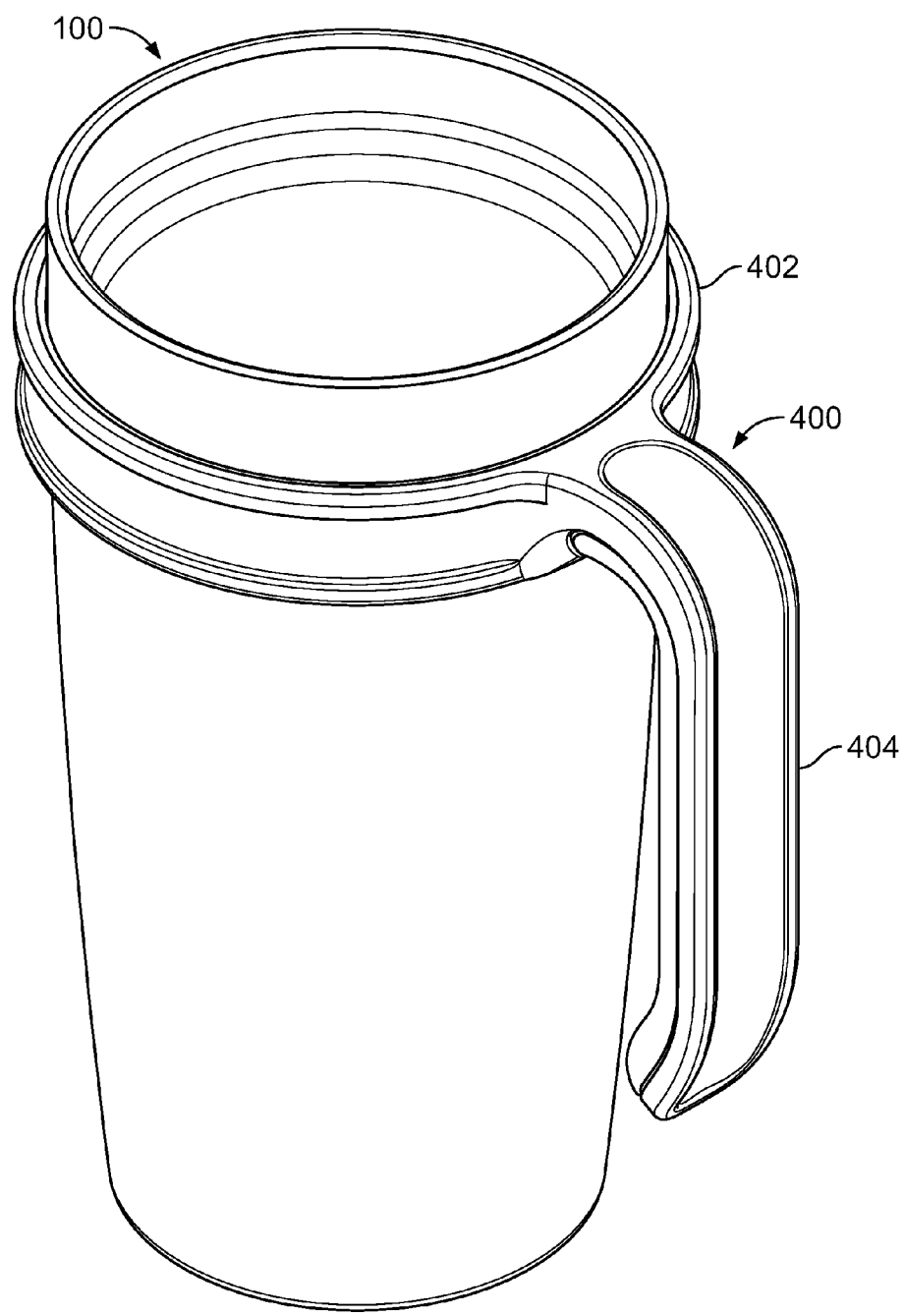
FIG. 4 depicts an isometric view of an example container and handle, according to one or more aspects described herein.
Figure 5:
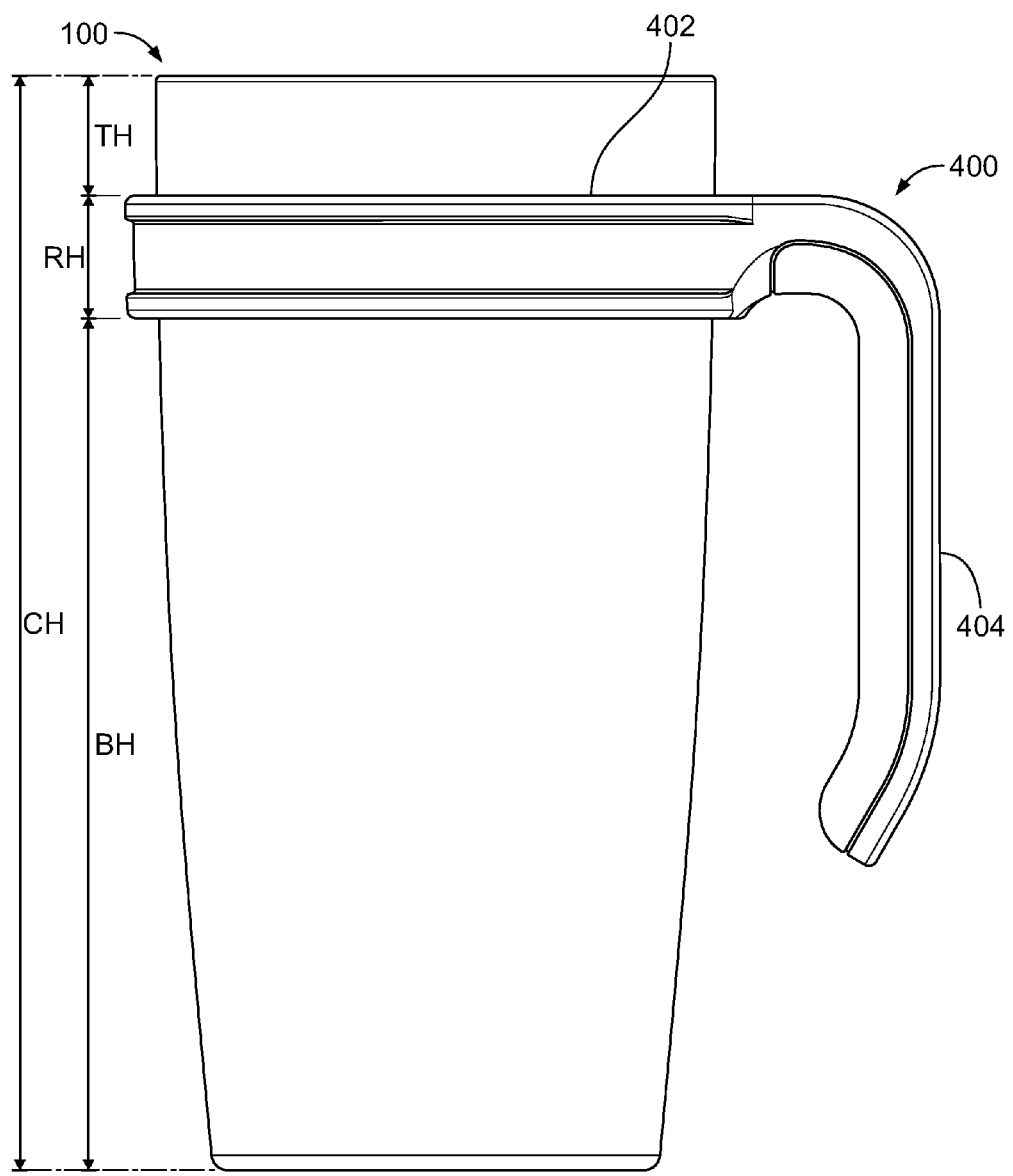
FIG. 5 depicts a side view of the container and handle shown in FIG. 4.
Figure 6:
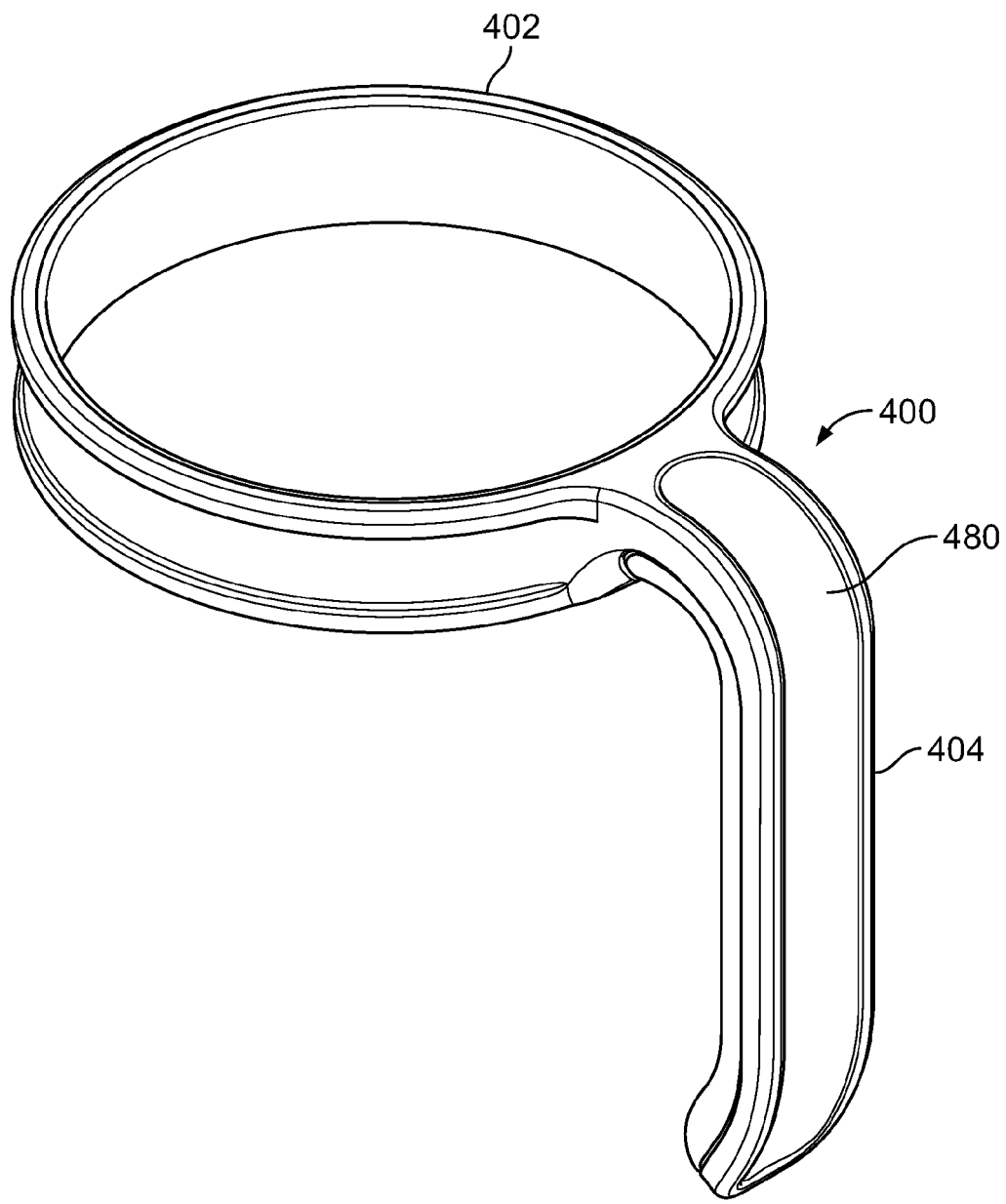
FIG. 6 depicts an isometric view of an example handle, according to one or more aspects described herein.

Referring now primarily to FIGS. 4-9 a handle 400 is shown. More specifically, FIGS. 4-5 depict the handle 400 engaged with the container 100, and FIGS. 6-9 depict the handle 400 separate from the container 100. The handle 400 generally includes a ring portion 402 for engaging the container 100, and a handle portion 404. The ring portion 402 and the handle portion 404 may be integrally formed or may be formed as separate portions.

As shown primarily in FIGS. 6-9, the ring portion 402 may comprise an annular wall 405 generally forming a substantially cylindrical shape. Although the ring portion 402 is shown having a generally cylindrical shape, in other embodiments the ring portion may have different shapes including square, rectangular, and triangular shaped cross-sections, to accommodate differently sized and shaped containers. The annular wall 405 may have an upper edge 406 and a lower edge 408 having a height of the ring ("RH") defined between the upper and lower edge. The annular wall may have a thickness of about 0.08 inches or about 0.05 inches to about 0.25 inches, which may be substantially similar over the entire annular wall 405. In some embodiments, as shown, for example, in FIGS. 6-9 the ring portion 402 may include one or more raised ridges 410. The one or more raised ridges may extend substantially around the entire annular wall 405 and may terminate near the handle portion 404. As shown in FIGS. 6-9 the handle 400 includes an upper ridge 410a extending around an upper portion of the annular wall 405 and lower ridge 410b extending around a lower portion of the wall. In other embodiments the ring portion 402 may include fewer or more raised ridges 410. The raised ridges 410 may have a height of about 0.04 inches or about 0.01 inches to about 0.10 inches. In some embodiments, the raised ridges 410 may increase the strength of the handle 400.

The interior surface 412 of the annular wall 405 may be substantially vertical such that the interior diameter of the annular wall 405 is substantially the same at the upper edge 406 as it is at the lower edge 408. However, as shown, for example, in FIG. 9 the interior wall may be angled such that the interior diameter at the upper edge 406 ("UD") is greater than the interior diameter at the lower edge 408 ("LD"). This configuration may advantageously allow a user to engage the handle 400 and container 100 by sliding the container 100 downward through the ring portion 402. Additionally, this may allow the handle 400 to better engage a container 100 having a tapered outer surface 108.

In some embodiments, the interior surface 412 may also include an engagement layer 414 of material that may have different properties than the annular wall 405. For example, the engagement layer 414 may be a material that is softer or more flexible than the remaining portions of the annular wall 405. This may allow the engagement layer 414 to removably engage the container 100 without scratching the finish of the outer wall or otherwise denting the outer wall of the container 100. In some embodiments, the engagement layer 414 may be the same material as the annular wall 405; however, it may have different properties than the annular wall 405. In other embodiments, the engagement layer 414 may be made of a different material than the annular wall 405. These materials can include rubber, plastics, elastomers, polypropylene (PP), and thermoplastic elastomers (TPE). The engagement layer may extend substantially the entire distance from the upper edge 406 to the lower edge 408; however, in other embodiments it may extend only a portion of this distance. Additionally, the engagement layer 414 may have a thickness of about 0.05 inches or may have a thickness in the range of about 0.01 inches to about 0.20 inches.

In some embodiments, the ring portion 402 may include a clasp, latch, or other tightening mechanism which may allow the ring portion 402 to tighten against the container 100. In such embodiments the ring portion may have a first end and a second end which may be connected by the tightening mechanism. Such a system may be particularly advantageous if the handle 400 is configured to engage a container having straight sidewalls.

As discussed above, the ring portion 402 may be permanently fixed to the handle portion 404. The handle portion 404 may be made of the same material as the ring portion 402 and may be integrally formed with the handle portion 404 during a molding operation. However, other techniques of securing the ring portion 402 to the handle portion 404 exist, such as fasteners or adhesives.

Figure 7:
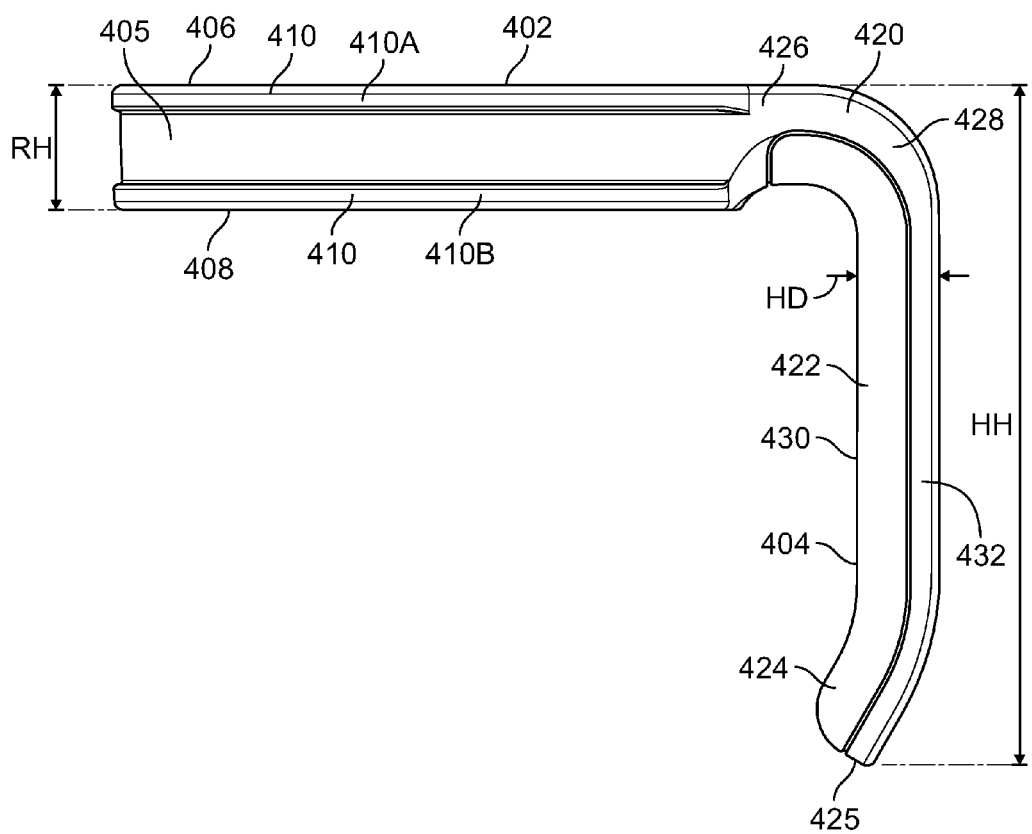
FIG. 7 depicts a side view of the handle shown in FIG. 6.
Figure 8:
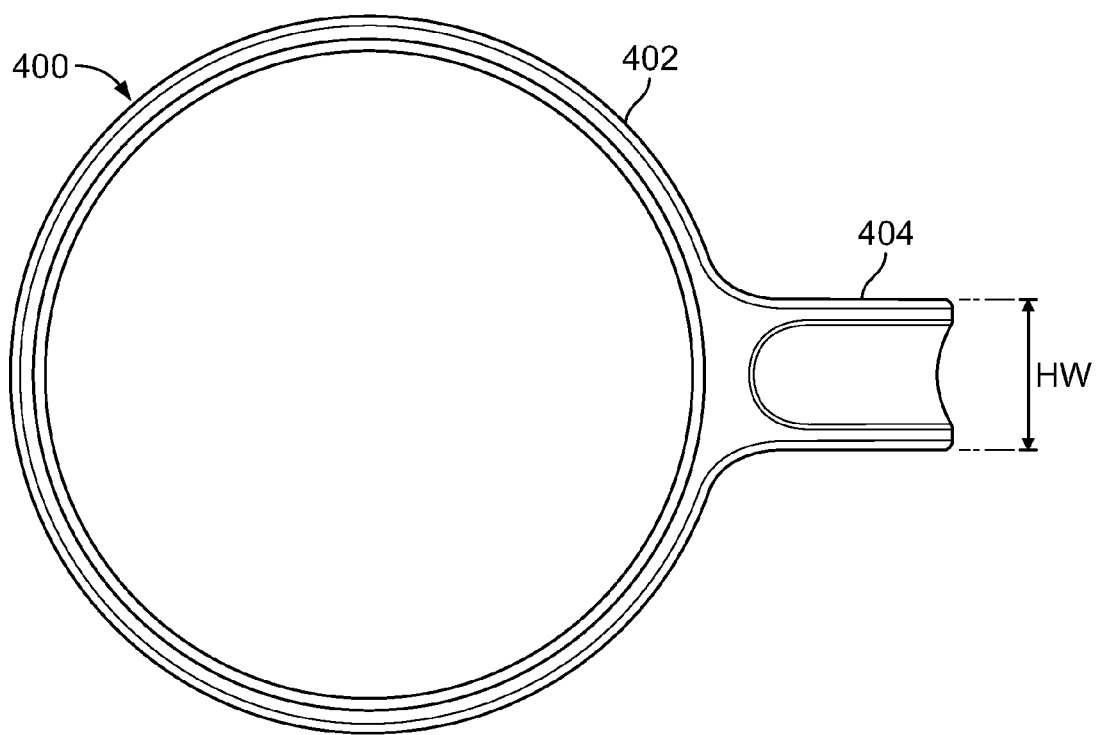
FIG. 8 depicts a top view of the handle shown in FIG. 6.
Figure 9:
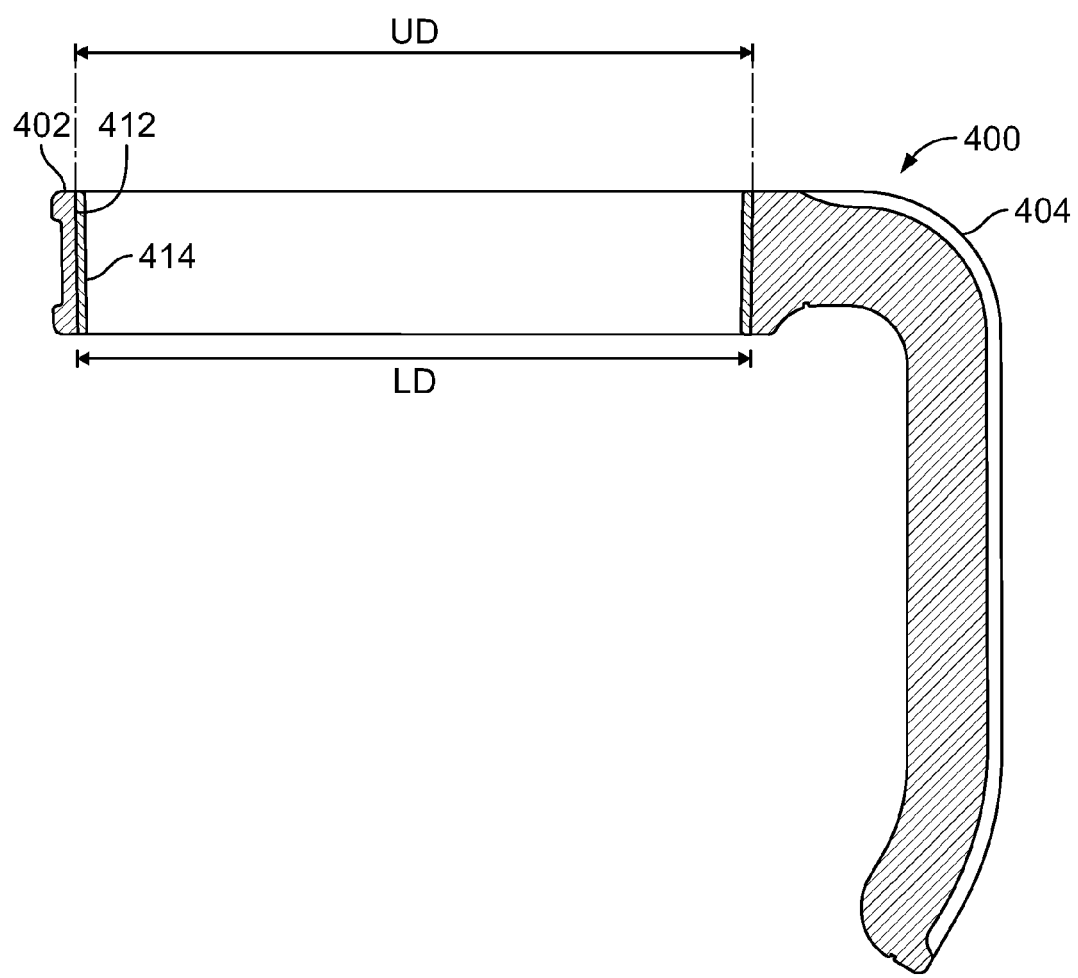
FIG. 9 depicts a side cross-sectional view of the handle shown in FIG. 6.

As shown primarily in FIGS. 6-9, the handle portion 404 may include an upper portion 420, a central portion 422, and a lower portion 424. The upper portion 420 includes a transition portion 426 between the ring portion 402 and the handle portion 404 and a downward curving portion 428. The central portion 422 extends substantially vertically downward from the upper portion 420. Thus, in some embodiments, and as shown primarily in FIG. 5, when the handle 400 is engaged with a container 100 having tapered sidewalls, the distance between the central portion 422 and the container 100 is greater at the bottom of the central portion 422 than at the top of the central portion 422. The lower portion 424 extends from the central portion 422 and may curve or angle inwards towards the container 100. As shown in FIG. 7, handle 400 may have a height "HH" defined between the upper edge 406 of the handle 400 and the bottom 425 of the lower portion 424. Additionally, as shown in FIGS. 7 and 8 the handle 400 may have a handle depth ("HD") and a handle width ("HW").

The handle portion 404 may also include an inner grip portion 430 and an outer portion 432. The inner grip portion 430 may be made of the same or different material as other portions of the handle 400. In some embodiments for example, the inner grip portion 430 may be composed of a different and/or more flexible material, allowing a user to obtain a better grip on the handle 400. In still other embodiments inner grip portion 430 may be made of the same material as the outer grip portion 432, but may have different material properties and/or may have a different surface finish or texture. Additionally, in some embodiments the handle 400 may include a depression 480 on an outside portion of the handle 400. The depression 480 may be a lengthwise depression as shown.

The location of the handle 400 relative to the container 100 may be important to the proper use of the container 100. As shown in FIG. 5, the vertical distance from the top end 110 of the container 100 to the upper edge 406 of the handle 400 is designated as "TH". Similarly, as shown in FIG. 5, the vertical distance from the base 114 of the container 100 to the lower edge 408 of the handle 400 is designated as "BH". As shown in FIG. 5, the container 100 has a vertical height of "CH" measured between the top end 110 and the base 114. As shown below in Table 1, these heights, and other distances discussed above, may have specific dimensions and specific ratios of dimensions that may increase the usability of the container 100/handle 400 combinations.

TABLE 1

Dimension of Container 100 and Handle 400

| Description | Dimension |
| --- | --- |
| Upper Ring Diameter (UD) | 3.39 inches; or about 3.22 inches to about 3.56 inches; or about 2.71 inches to about 4.07 inches |
| Lower Ring Diameter (LD) | 3.36 inches; or about 3.19 inches to about 3.53 inches; or about 2.69 inches to about 4.03 inches |
| Container Height (CH) | 6.6 inches; or about 6.27 inches to about 6.93 inches; or about 5.28 inches to about 7.92 inches |
| Ring Height (RH) | 0.75 inches; or about 0.71 inches to about 0.79 inches; or about 0.60 inches to about 0.90 inches |

TABLE 1-continued

Dimension of Container 100 and Handle 400

| Description | Dimension |
|---|---|
| Top Edge of Ring to Top End of Container (TH) | 1.19 inches; or about 1.13 inches to about 1.25 inches; or about 0.875 inches to about 1.50 inches |
| Bottom Edge of Ring to Base of Container (BH) | 4.66 inches; or about 4.43 inches to about 4.89 inches; or about 3.73 inches to about 5.59 inches |
| Handle Height (HH) | 4.1 inches; or about 3.90 inches to about 4.31 inches; or about 3.28 inches to about 4.92 inches |
| Handle Width (HW) | 0.8 inches; or about 0.76 inches to about 0.84 inches; or about 0.64 inches to about 0.96 inches |
| Handle Depth (HD) | 0.61 inches; or about 0.58 inches to about 0.64 inches; or about 0.49 inches to about 0.73 inches |
| Ratio of Container Height (CH) to Top Edge of Ring to Top End of Container (TH) - [(CH)/(TH)] | 5.55; or about 5.27 to about 5.82; or about 4.44 to about 6.66 |
| Ratio of Container Height (CH) to Handle Height (HH) - [(CH)/(HH)] | 1.61; or about 1.53 to about 1.69; or about 1.29 to about 1.93 |

FIGS. 10-15 depict another example handle 500, wherein like reference numerals refer to the same or similar elements in handle 400 but include 500 series reference numerals. Additionally, FIGS. 10-15 use similar dimensioned names as those shown in FIGS. 4-9.

Figure 10:
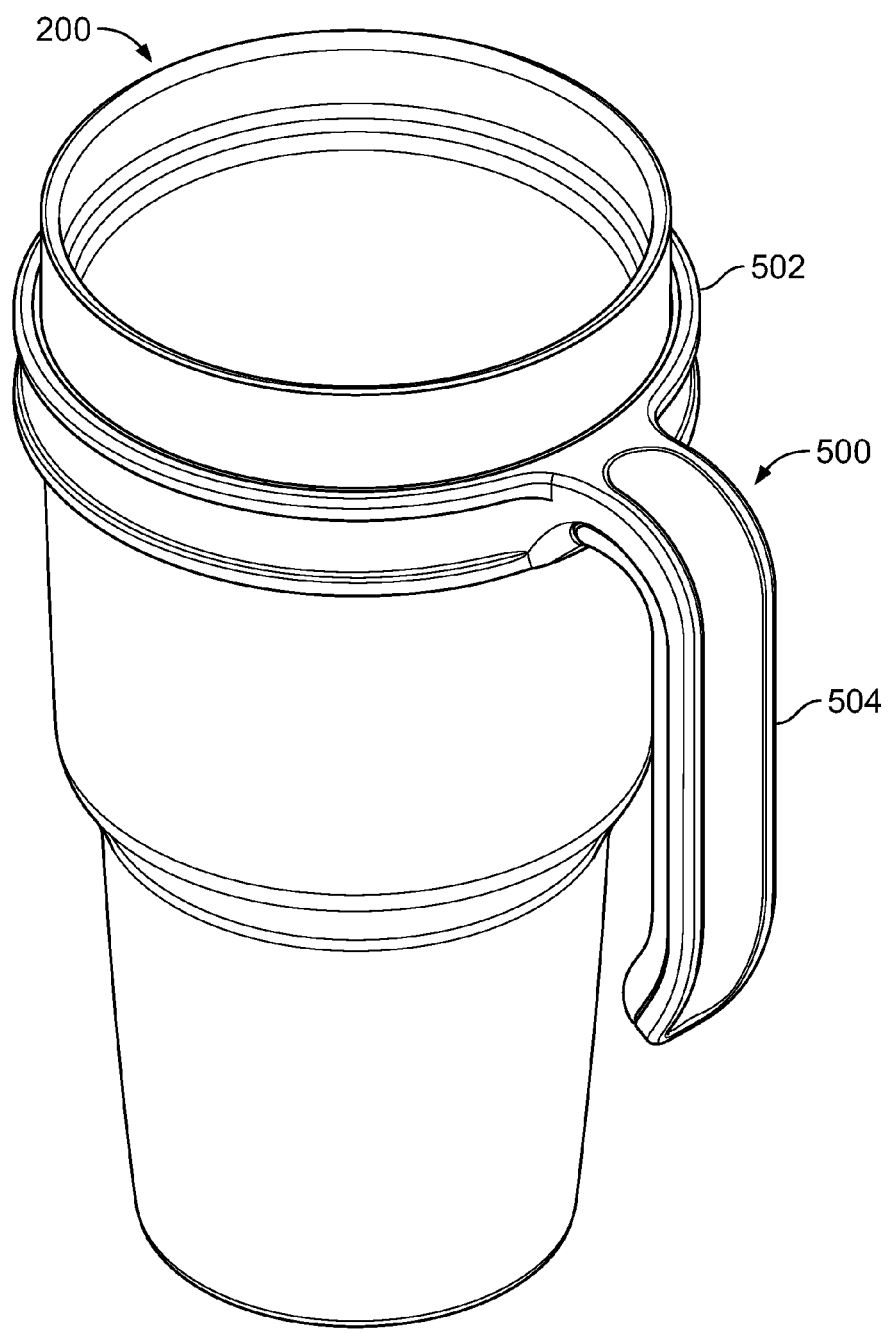
FIG. 10 depicts an isometric view of an example container and handle, according to one or more aspects described herein.
Figure 11:
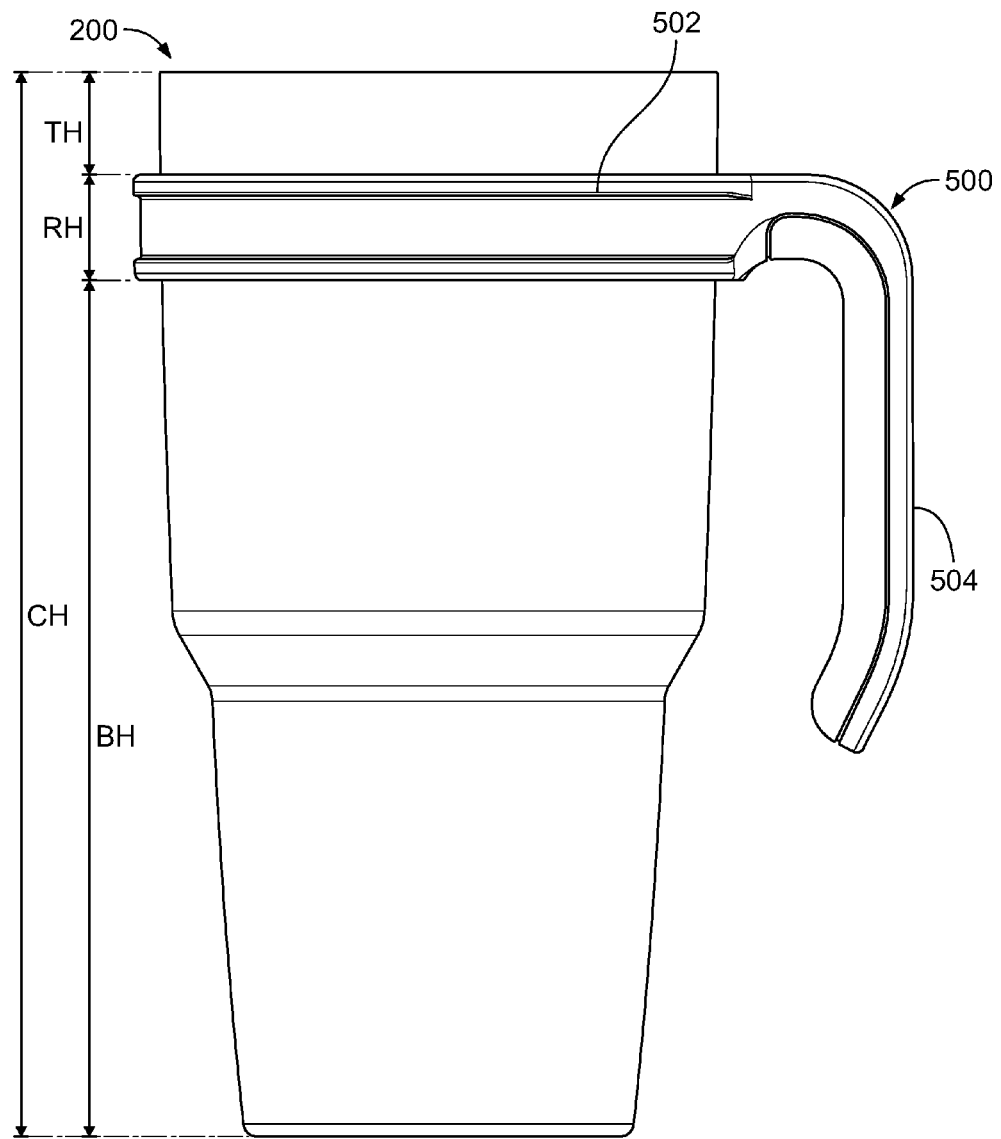
FIG. 11 depicts a side view of the container and handle shown in FIG. 10.
Figure 12:
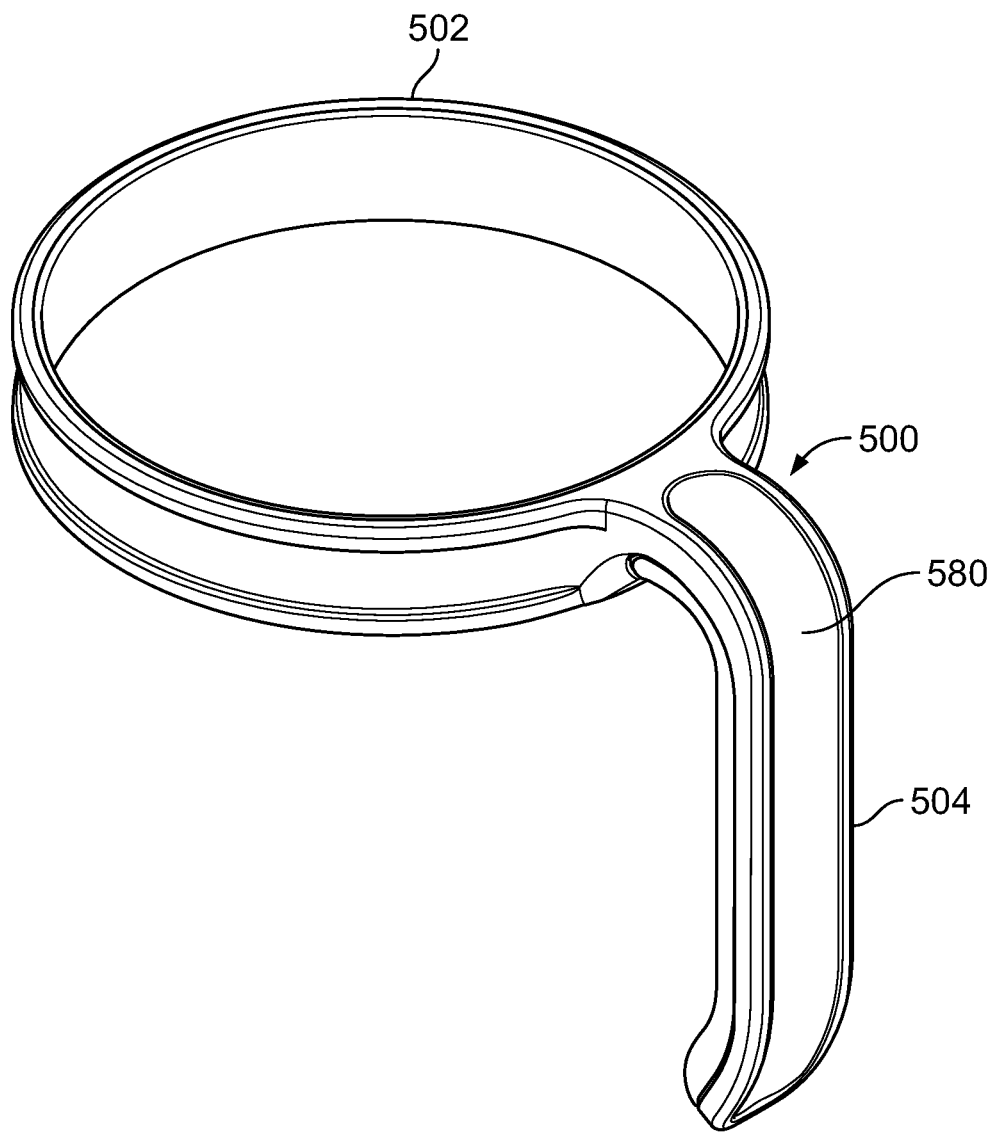
FIG. 12 depicts an isometric view of an example handle, according to one or more aspects described herein.

Referring now primarily to FIGS. 10-15 a handle 500 is shown. More specifically, FIGS. 10-11 depict the handle 500 engaged with the container 200, and FIGS. 12-15 depict the handle 500 separate from the container 200. The handle 500 generally includes a ring portion 502 for engaging the container 200, and a handle portion 504. The ring portion 502 and the handle portion 504 may be integrally formed or may be formed as separate portions.

As shown primarily in FIGS. 12-15, the ring portion 502 may comprise an annular wall 505 generally forming a substantially cylindrical shape. Although the ring portion 502 is shown having a generally cylindrical shape, in other embodiments the ring portion may have different shapes including square, rectangular, and triangular shaped cross-sections, to accommodate differently sized and shaped containers. The annular wall 505 may have an upper edge 506 and a lower edge 508 having a height of the ring ("RH") defined between the upper and lower edge. The annular wall may have a thickness of 0.08 inches or about 0.08 inches or about 0.05 inches to about 0.25 inches, which may be substantially similar over the entire annular wall 505. In some embodiments, as shown, for example, in FIGS. 12-15 the ring portion 502 may include one or more raised ridges 510. The one or more raised ridges may extend substantially around the entire annular wall 505, and may terminate near the handle portion 504. As shown in FIGS. 12-15 the handle 500 includes an upper ridge 510A extending around an upper portion of the annular wall 505 and lower ridge 510B extending around a lower portion of the wall. In other embodiments the ring portion 502 may include fewer or more raised ridges 510. The raised ridges 510 may have a height about 0.04 inches or about 0.01 inches to about 0.10 inches. In some embodiments, the raised ridges 510 may increase the strength of the handle 500.

The interior surface 512 of the annular wall 505 may be substantially vertical such that the interior diameter of the annular wall 505 is substantially the same at the upper edge 506 as it is at the lower edge 508. However, as shown, for example, in FIG. 15 the interior wall may be angled such that the interior diameter at the upper edge 506 ("UD") is greater than the interior diameter at the lower edge 508 ("LD"). This configuration may advantageously allow a user to engage the handle 500 and container 200 by sliding the container 200 downward through the ring portion 502. Additionally, this may allow the handle 500 to better engage a container 200 having a tapered outer surface 208.

In some embodiments the interior surface 512 may also include an engagement layer 514 of material that may have different properties than the annular wall 505. For example, the engagement layer 514 may be a material that is softer or more flexible than the remaining portions of the annular wall 505. This may allow the engagement layer 514 to removably engage the container 200 without scratching the finish of the outer wall or otherwise denting the outer wall of the container 200. In some embodiments the engagement layer 514 may be the same material as the annular wall 505, however, it may have different properties than the annular wall 505. In other embodiments, the engagement layer 514 may be made of a different material than the annular wall 505. These materials can include rubber, plastics, elastomers, polypropylene (PP), and thermoplastic elastomers (TPE). The engagement layer may extend substantially the entire distance from the upper edge 506 to the lower edge 508, however, in other embodiments it may extend only a portion of this distance. Additionally, the engagement layer 514 may have a thickness of about 0.05 inches or may have a thickness in the range of about 0.01 inches to about 0.20 inches.

In some embodiments, the ring portion 502 may include a clasp, latch, or other tightening mechanism which may allow the ring portion 502 to tighten against the container 200. In such embodiments the ring portion may have a first end and a second end which may be connected by the tightening mechanism. Such a system may be particularly advantageous if the handle 500 is configured to engage a container having straight sidewalls.

As discussed above, the ring portion 502 may be permanently fixed to the handle portion 504. The handle portion 504 may be made of the same material as the ring portion 502 and may be integrally formed with the handle portion 504 during a molding operation. However, other techniques of securing the ring portion 402 to the handle portion exist, such as fasteners or adhesives.

Figure 13:
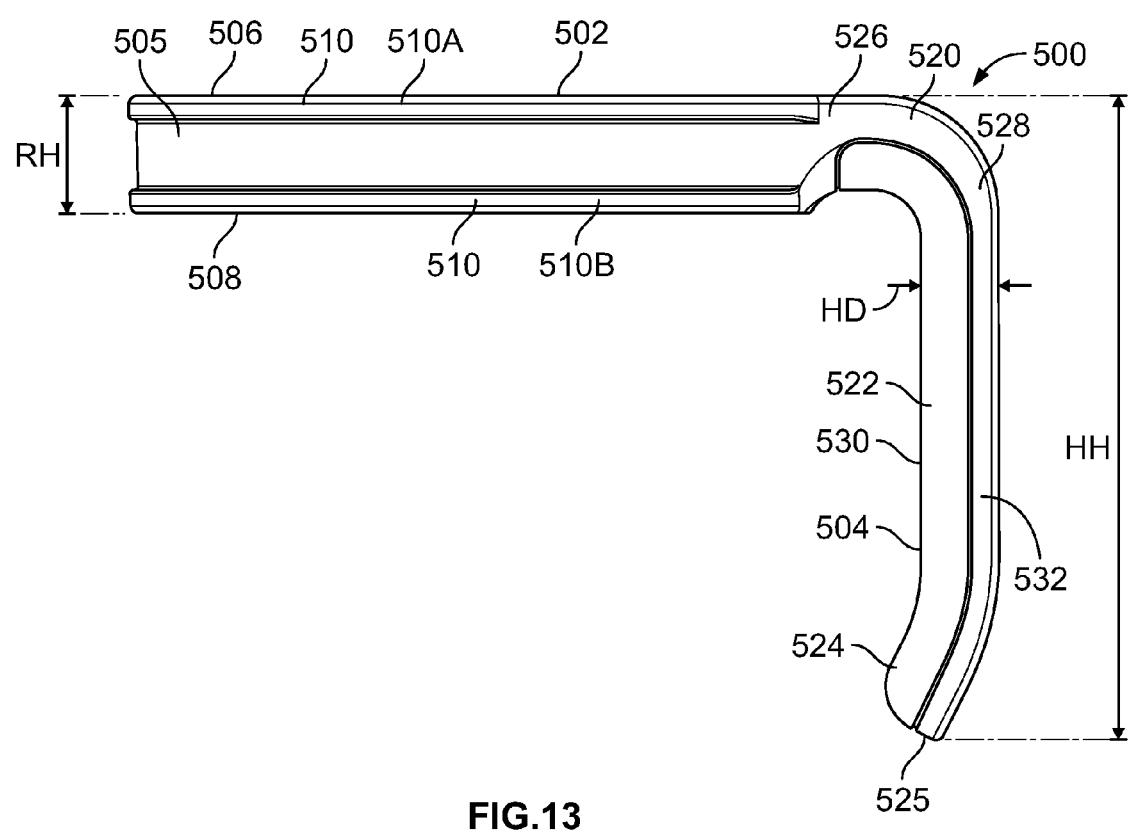
FIG. 13 depicts a side view of the handle shown in FIG. 12.
Figure 14:
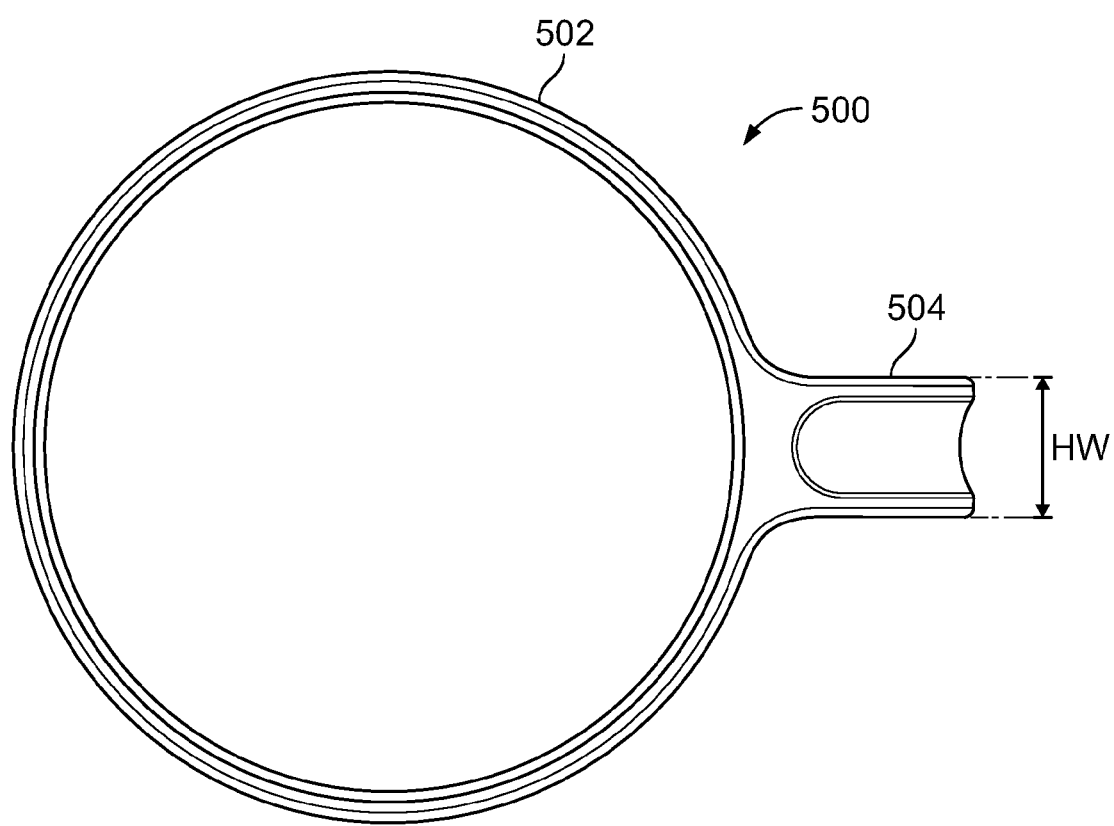
FIG. 14 depicts a top view of the handle shown in FIG. 12.
Figure 15:
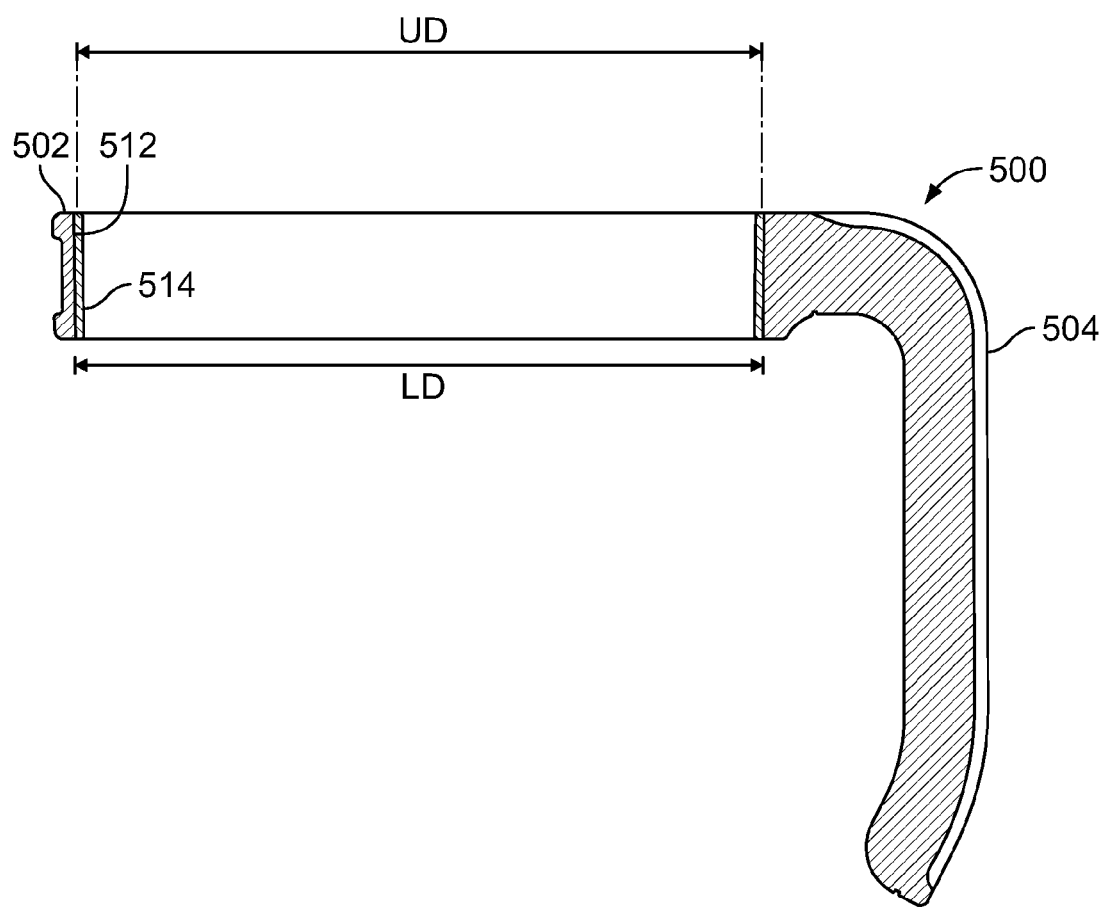
FIG. 15 depicts a side cross-sectional view of the handle shown in FIG. 12.

As shown primarily in FIGS. 12-15, the handle portion 504 may include an upper portion 520, a central portion 522, and a lower portion 524. The upper portion 520 includes a transition portion 526 between the ring portion 502 and the handle portion 504 and a downward curving portion 528. The central portion 522 extends substantially vertically downward from the upper portion 520. Thus, in some embodiments, and as shown primarily in FIG. 11, when the handle 500 is engaged with a container 200 having tapered sidewalls, the distance between the central portion 522 and the container 200 is greater at the bottom of the central portion 522 than at the top of the central portion 522. The lower portion 524 extends from the central portion 522 and may curve or angle inwards towards the container 200. As shown in FIG. 13, handle 500 may have a height "HH" defined between the upper edge 506 of the handle 500 and the bottom 525 of the lower portion 524. Additionally, as shown in FIGS. 13 and 14 the handle 500 may have a handle depth ("HD") and a handle width ("HW").

The handle portion 504 may also include an inner grip portion 530 and an outer portion 532. The inner grip portion 530 may be made of the same or different material as other portions of the handle 500. In some embodiments for example, the inner grip portion may be composed of a different and/or more flexible material, allowing a user to obtain a better grip on the handle 500. In still other embodiments inner grip portion 530 may be made of the same material as the outer grip portion 532, but may have different material properties and/or may have a different surface finish or texture. Additionally, in some embodiments the handle 500 may include a depression 580 on an outside portion of the handle 500. The depression 580 may be a lengthwise depression as shown.

The location of the handle 500 relative to the container 200 may be important to the proper use of the container 200. As shown in FIG. 11, the vertical distance from the top end 210 of the container 200 to the upper edge 506 of the handle 500 is designated as "TH". Similarly, as shown in FIG. 11, the vertical distance from the base 214 of the container 200 to the lower edge 508 of the handle 500 is designated as "BH". As shown in FIG. 11, the container 200 has a vertical height of "CH" measured between the top end 210 and the base 214. As shown below in Table 2, these heights, and other distances discussed above, may have specific dimensions and specific ratios of dimensions that may increase the usability of the container 200/handle 500 combinations.

TABLE 2

Dimension of Container 200 and Handle 500

| Description | Dimension |
|---|---|
| Upper Ring Diameter (UD) | 3.89 inches; or about 3.70 inches to about 4.08 inches; or about 3.11 inches to about 4.67 inches |
| Lower Ring Diameter (LD) | 3.87 inches; or about 3.68 inches to about 4.06 inches; or about 3.10 inches to about 4.64 inches |
| Container Height (CH) | 7.62 inches; or about 7.24 inches to about 8.00 inches; or about 6.10 inches to about 9.14 inches |
| Ring Height (RH) | 0.75 inches; or about 0.71 inches to about 0.79 inches; or about 0.60 inches to about 0.90 inches |
| Top Edge of Ring to Top End of Container (TH) | 1.13 inches; or about 1.07 inches to about 1.19 inches; or about 0.75 inches to about 1.50 inches |
| Bottom Edge of Ring to Base of Container (BH) | 5.74 inches; or about 5.45 inches to about 6.03 inches; or about 4.59 inches to about 6.89 inches |
| Handle Height (HH) | 4.1 inches; or about 3.90 inches to about 4.31 inches; or about 3.28 inches to about 4.92 inches |
| Handle Width (HW) | 0.8 inches; or about 0.76 inches to about 0.84 inches; or about 0.64 inches to about 0.96 inches |
| Handle Depth (HD) | 0.61 inches; or about 0.58 inches to about 0.64 inches; or about 0.49 inches to about 0.73 inches |
| Ratio of Container Height (CH) to Top Edge of Ring to Top End of Container (TH) - [(CH)/(TH)] | 6.74; or about 6.41 to about 7.08; or about 5.39 to about 8.09 |
| Ratio of Container Height (CH) to Handle Height (HH) - [(CH)/(HH)] | 1.86; or about 1.77 to about 1.95; or about 1.49 to about 2.23 |

FIGS. 16-21 depict another example handle 600, wherein like reference numerals refer to the same or similar elements in handle 400 but include 600 series reference numerals. Additionally, FIGS. 16-21 use similar dimensioned names as those shown in FIGS. 4-9 and FIGS. 10-15.

Figure 16:
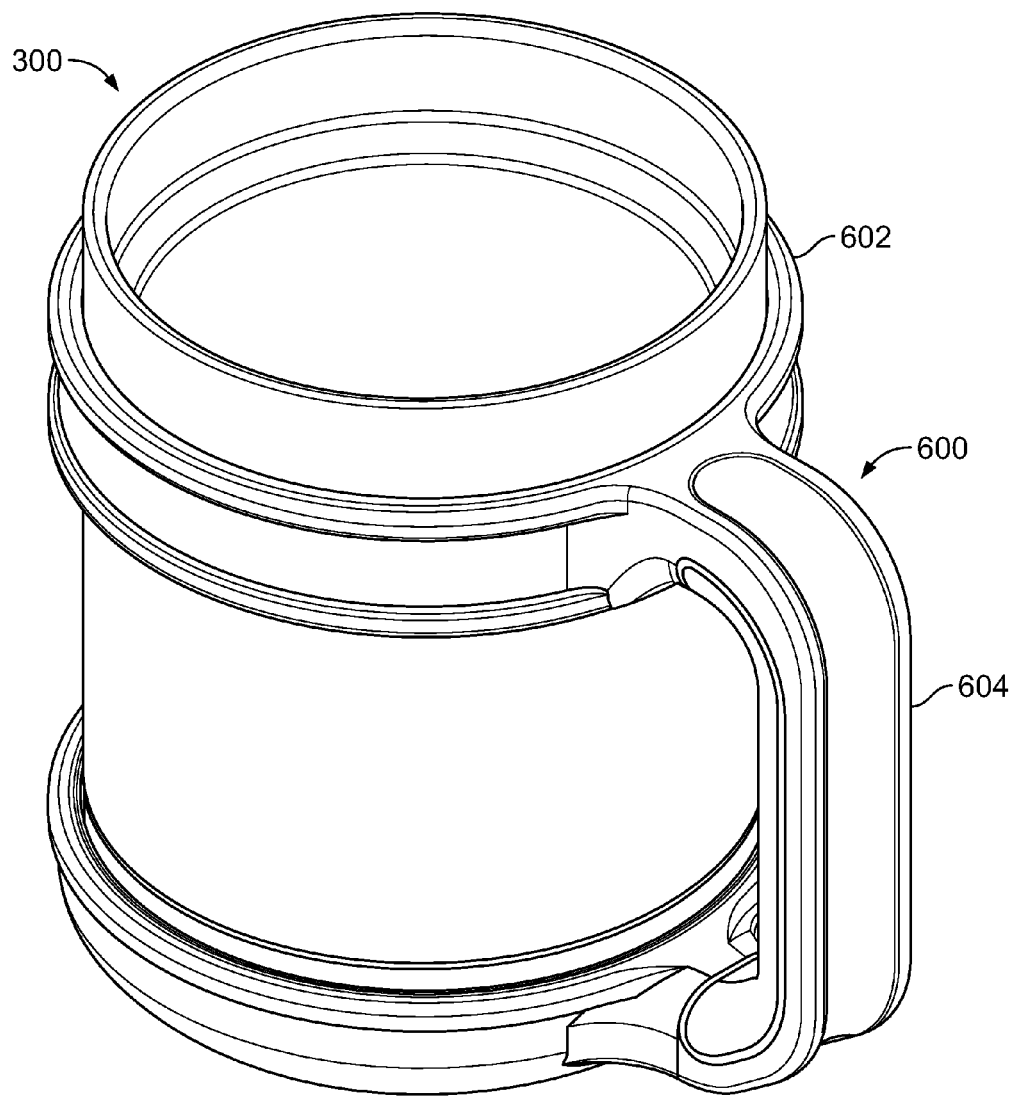
FIG. 16 depicts an isometric view of an example container and handle, according to one or more aspects described herein.
Figure 17:
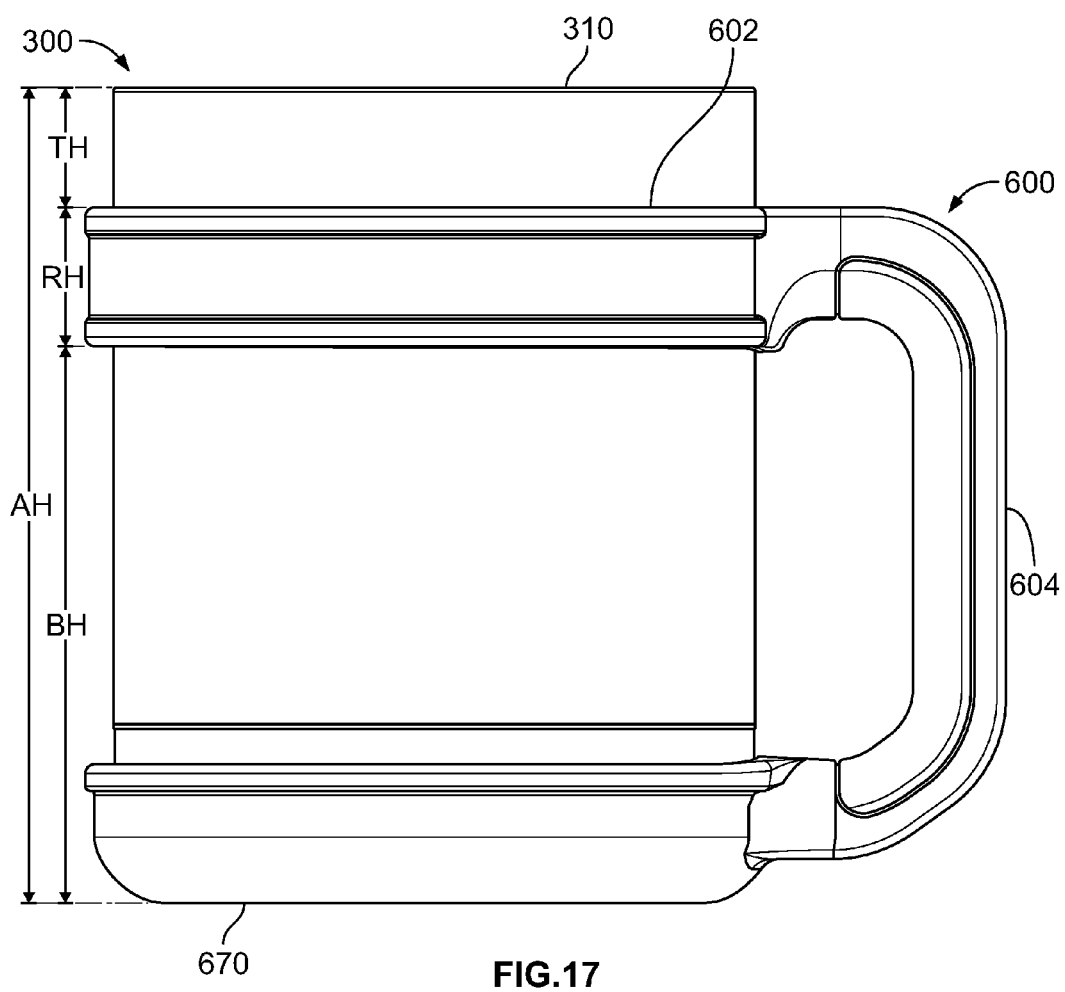
FIG. 17 depicts a side view of the container and handle shown in FIG. 16.
Figure 18:
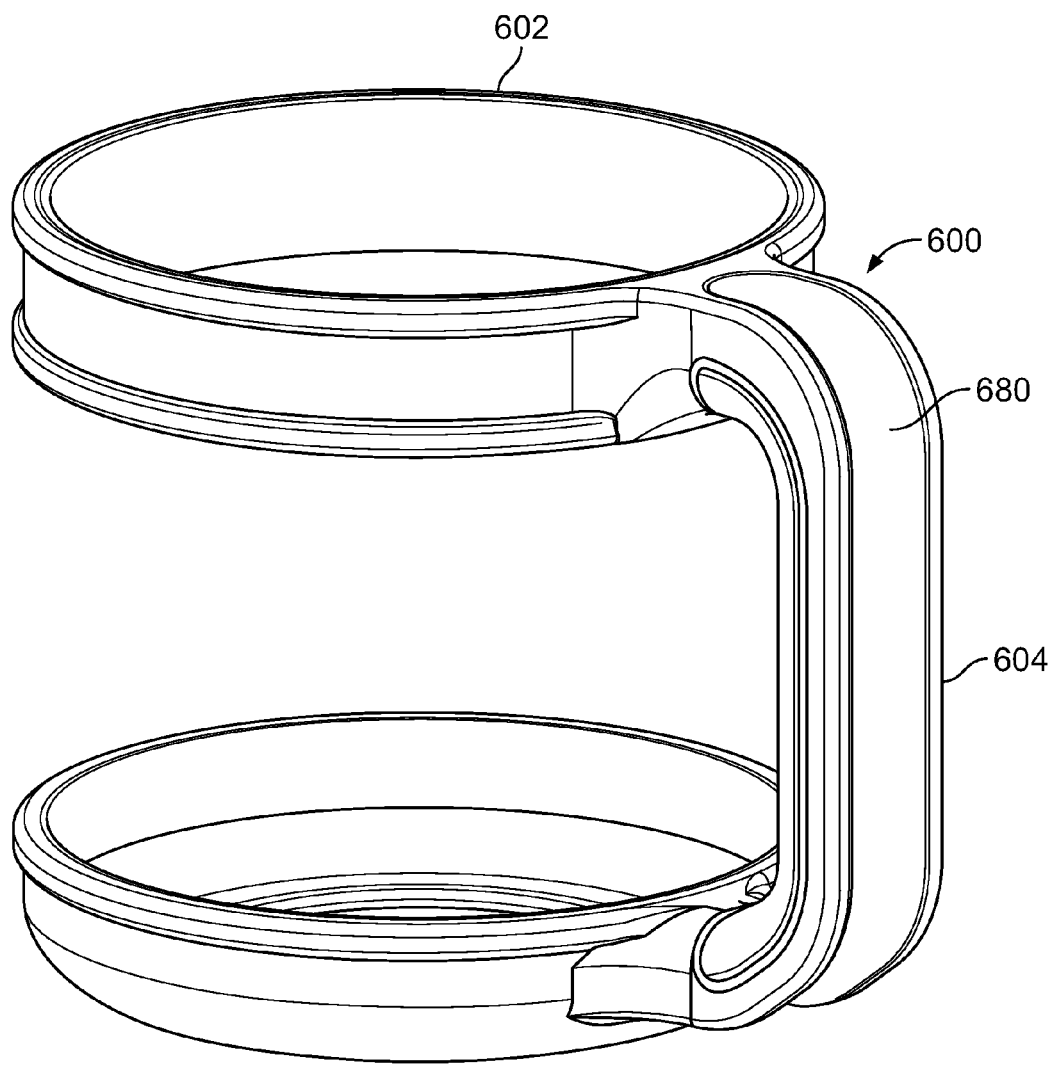
FIG. 18 depicts an isometric view of an example handle, according to one or more aspects described herein.

Referring now primarily to FIGS. 16-21 a handle 600 is shown. More specifically, FIGS. 16-17 depict the handle 600 engaged with the container 300, and FIGS. 18-21 depict the handle 600 separate from the container 300. Similar to the examples discussed above, the handle 600 generally includes a ring portion 602 for engaging the container 300, and a handle portion 604. In some embodiments, the container 300 may have vertically straight sidewalls 308, and in such embodiments the handle 600 may include a base portion 650 to further support the container 300. The ring portion 602, handle portion 604, and base portion 650 may be integrally formed or may be formed as separate portions.

As shown primarily in FIGS. 18-21, the ring portion 602 may comprise an annular wall 605 generally forming a substantially cylindrical shape. Although the ring portion 604 is shown having a generally cylindrical shape, in other embodiments the ring portion may have different shapes including square, rectangular, and triangular shaped cross-sections, to accommodate differently sized and shaped containers. The annular wall 605 may have an upper edge 606 and a lower edge 608 having a height of the ring ("RH") defined between the upper and lower edge. The annular wall may have a thickness of about 0.08 inches to about 0.09 inches, which may be substantially similar over the entire annular wall 605. In some embodiments, as shown, for example, in FIGS. 18-21 the ring portion 602 may include one or more raised ridges 610. The one or more raised ridges may extend substantially around the entire annular wall 605. As shown in FIGS. 18-21 the handle 600 includes an upper ridge 610a extending around an upper portion of the annular wall 505 and lower ridge 610b extending around a lower portion of the wall. In other embodiments the ring portion 602 may include fewer or more raised ridges 610. The raised ridges 610 may have a height of about 0.04 inches or about 0.01 inches to about 0.10 inches. In some embodiments, the raised ridges 610 may increase the strength of the handle 600.

The interior surface 612 of the annular wall 605 may be substantially vertical such that the interior diameter of the annular wall 605 is substantially the same at the upper edge 606 as it is at the lower edge 608. However, in other embodiments, the interior wall may be angled such that the interior diameter at the upper edge 606 is greater than the interior diameter at the lower edge 608 ("LD"). The angle of the interior wall may be about 1 degree or about 0.5 degree to about 3 degrees. This configuration may advantageously allow a user to engage the handle 600 and container 300 by sliding the container 300 downward through the ring portion 602. Additionally, this may allow the handle 600 to better engage a container having a tapered outer surface or a straight vertical outer surface.

In some embodiments the interior surface 612 may also include an engagement layer 614 of material that may have different properties than the annular wall 605. For example, the engagement layer 614 may be a material that is softer or more flexible than the remaining portions of the annular wall 605. This may allow the engagement layer 614 to removably engage the container 300 without scratching the finish of the outer wall or otherwise denting the outer wall of the container 300. In some embodiments the engagement layer 614 may be the same material as the annular wall 605, however, it may have different properties than the annular wall 605. In other embodiments, the engagement layer 614 may be made of a different material than the annular wall 605. These materials can include rubber, plastics, elastomers, polypropylene (PP), and thermoplastic elastomers (TPE). The engagement layer may extend substantially the entire distance from the upper edge 606 to the lower edge 608, however, in other embodiments it may extend only a portion of this distance. Additionally, the engagement layer 614 may have a thickness of about 0.06 inches or may have a thickness in the range of about 0.01 inches to about 0.20 inches.

In some embodiments, the ring portion 602 may include a clasp, latch, or other tightening mechanism which may allow the ring portion 602 to tighten against the container 300. In such embodiments the ring portion may have a first end and a second end which may be connected by the tightening mechanism. Such a system may be particularly advantageous if the handle 600 is configured to engage a container having straight sidewalls.

As discussed above, the ring portion 602 may be permanently engaged with the handle portion 604. The handle portion 604 may be made of the same material as the ring portion 602 and may be integrally formed with the handle portion 604.

As shown primarily in FIGS. 18-21, the handle portion 604 may include an upper portion 620, a central portion 622, and a lower portion 624. The upper portion 620 includes a transition portion 626 between the ring portion 502 and the handle portion 604 and a downward curving portion 628. The central portion 622 extends substantially vertically downward from the upper portion 620. Thus, in some embodiments, and as shown primarily in FIG. 17, when the handle 600 is engaged with a container 300 having substantially straight sidewalls, the distance between the central portion 622 and the container 300 will stay substantially the same over the length of the central portion 622. The lower portion 620 includes a downward curving portion 638 and a transition portion 636 between handle portion 604 and the base portion 650.

As shown primarily in FIGS. 18-21, the base portion 650 may comprise an annular wall 655. The annular wall 655 of the base portion 650 may curve inward such that the annular wall includes a sidewall portion 656 and a bottom portion 658. In some embodiments, as shown, for example, in FIGS. 18-21 the base portion 650 may include one or more raised ridges 660. The one or more raised ridges 660 may extend substantially around the entire annular wall 655. The raised ridge(s) 660 may have a height of about 0.04 inches or about 0.01 inches to about 0.10 inches.

The base portion 650 may also include an aperture 662. The aperture 662 may pass through the bottom portion 658 of the annular wall 655. Advantageously, the aperture 662 may allow for easier insertion of container 300 into handle 600.

In some embodiments the interior surface 662 of the bottom portion 658 may include a bottom engagement layer 664 of material that may have different properties than the annular wall 655. For example, the bottom engagement layer 664 may be a material that is softer or more flexible than the remaining portions of the annular wall 655. In some embodiments the bottom engagement layer 664 may be the same material as the annular wall 655, however, it may have different properties than the annular wall 655. In other embodiments, the bottom engagement layer 664 may be made of a different material than the annular wall 655. These materials can include rubber, plastics, elastomers, and thermoplastic elastomers (TPE). As show, primarily in FIG. 21, the engagement layer 664, may form a ring in the base portion 650. The bottom engagement layer 664 may have a thickness of about 0.11 inches or may have a thickness in the range of about 0.05 inches to about 0.25 inches.

Figure 19:
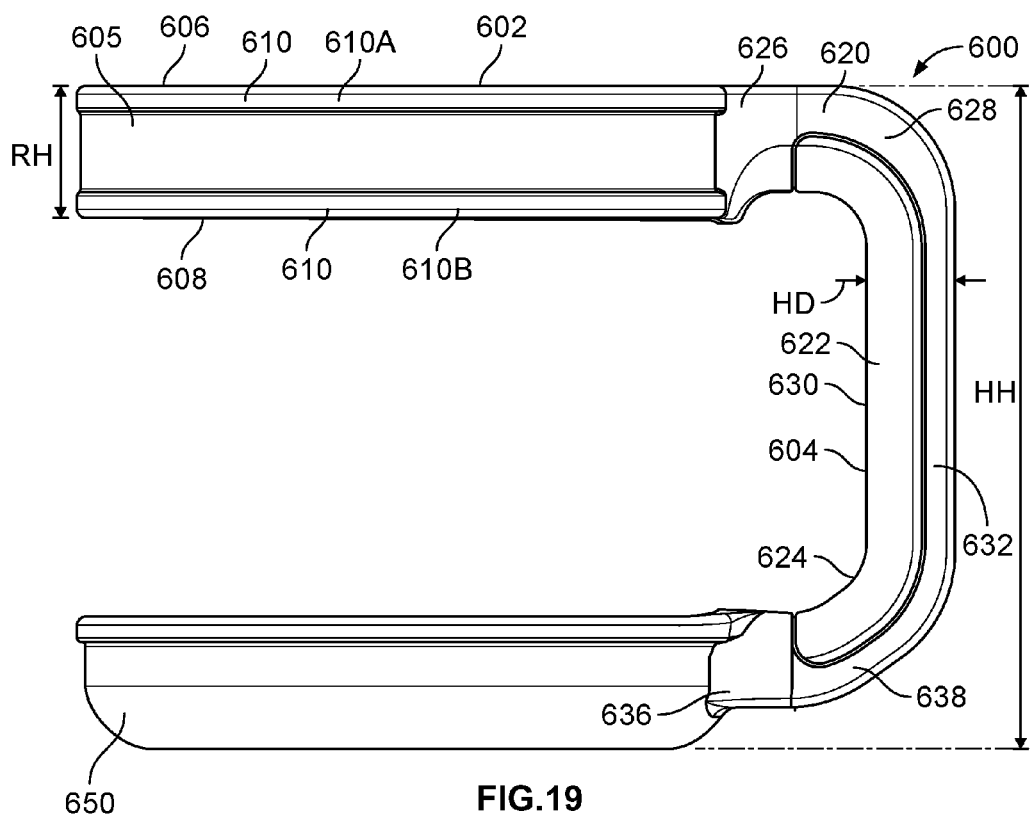
FIG. 19 depicts a side view of the handle shown in FIG. 18.
Figure 20:
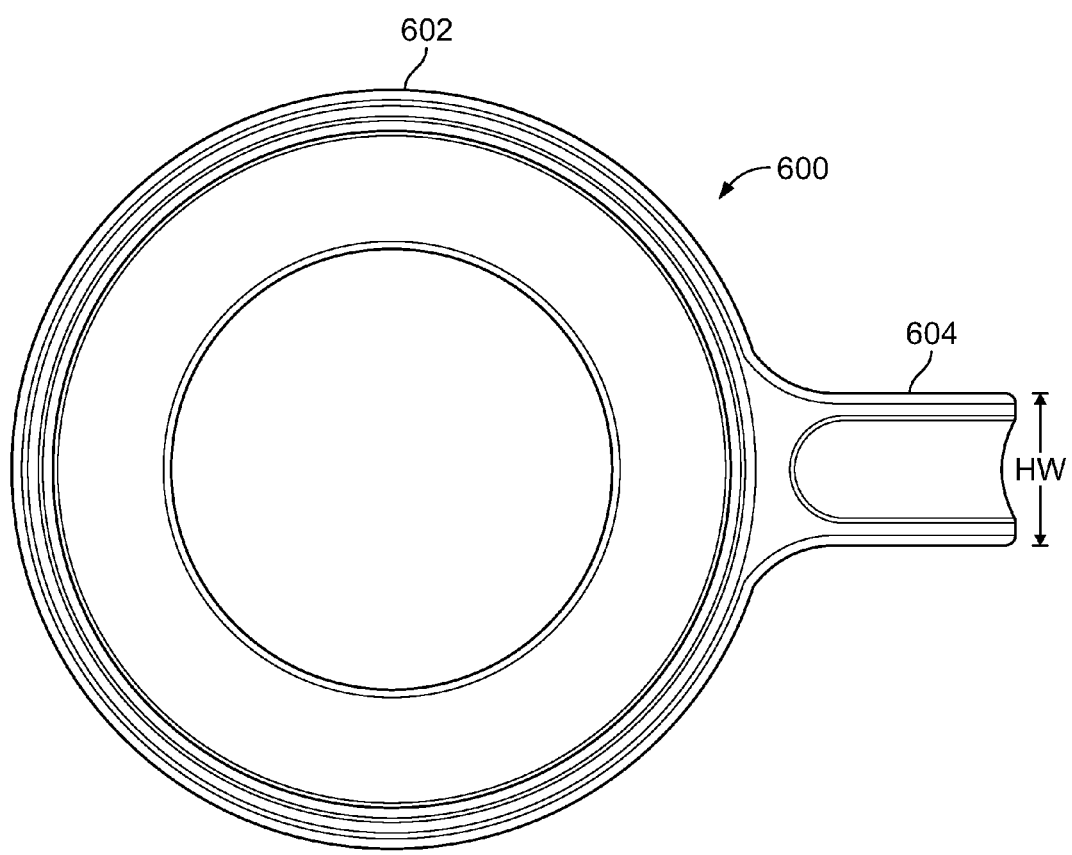
FIG. 20 depicts a top view of the handle shown in FIG. 18.

As shown in FIG. 19, handle 600 may have a height "HH" defined between the upper edge 606 of the handle 600 and the base 670 of the container handle 600. Additionally, as shown in FIGS. 19 and 20 the handle 600 may have a handle depth ("HD") and a handle width ("HW").

The handle portion 604 may also include an inner grip portion 630 and an outer portion 632. The inner grip portion 630 may be made of the same or different material as other portions of the handle 600. In some embodiments for example, the inner grip portion may be composed of a different and/or more flexible material, allowing a user to obtain a better grip on the handle 600. In still other embodiments inner grip portion 630 may be made of the same material as the outer grip portion 632, but may have different material properties and/or may have a different surface finish or texture. Additionally, in some embodiments the handle 600 may include a depression 680 on an outside portion of the handle 600. The depression 680 may be a lengthwise depression as shown.

The location of the handle 600 relative to the container 600 may be important to the proper use of the container 300. As shown in FIG. 17, the vertical distance from the top end 310 of the container 300 to the upper edge 606 of the handle 600 is designated as "TH". Similarly, as shown in FIG. 17, the vertical distance from the base 670 of the container handle 600 to the lower edge 608 of the handle 500 is designated as "BH". As shown in FIG. 17, the combined vertical height of the container 300 and the handle 600 is designated as "AH" and is measured between the top end 610 and the handle base 670. As shown below in Table 3, these heights, and other distances discussed above, may have specific dimensions and specific ratios of dimensions that may increase the usability of the container 300/handle 600 combinations.

TABLE 3

Dimension of Container 300 and Handle 600

| Description | Dimension |
|---|---|
| Lower Ring Diameter (LD) | 3.33 inches; or about 3.16 inches to about 3.50 inches; or about 2.66 inches to about 4.00 inches |
| Container Height | 4.14 inches; or about 3.93 inches to about 4.35 inches; or about 3.31 inches to about 4.97 inches |
| Ring Height (RH) | 0.75 inches; or about 0.71 inches to about 0.79 inches; or about 0.60 inches to about 0.90 inches |
| Top Edge of Ring to Top End of Container (TH) | 0.65 inches; or about 0.62 inches to about 0.68 inches; or about 0.52 inches to about 0.78 inches |
| Bottom Edge of Ring to Base of Handle (BH) | 2.99 inches; or about 2.84 inches to about 3.14 inches; or about 2.39 inches to about 3.59 inches |
| Total Height of Container and Handle (AH) | 4.39 inches; or about 4.17 inches to about 4.61 inches; or about 3.51 inches to about 5.27 inches |
| Handle Height (HH) | 3.74 inches; or about 3.55 inches to about 3.93 inches; or about 2.99 inches to about 4.49 inches |
| Handle Width (HW) | 0.8 inches; or about 0.76 inches to about 0.84 inches; or about 0.64 inches to about 0.96 inches |
| Handle Depth (HD) | 0.61 inches; or about 0.58 inches to about 0.64 inches; or about 0.49 inches to about 0.73 inches |
| Ratio of Total Height of Container and Handle (AH) to Top Edge of Ring to Top End of Container (TH) [AH/TH] | 6.75; or about 6.42 to about 7.09; or about 5.40 to about 8.10 |
| Ratio of Total Height of Container and Handle (AH) to Handle Height (HH) [AH/HH] | 1.17; or about 1.12 to about 1.23; or about 0.94 to about 1.41 |

Figure 21:
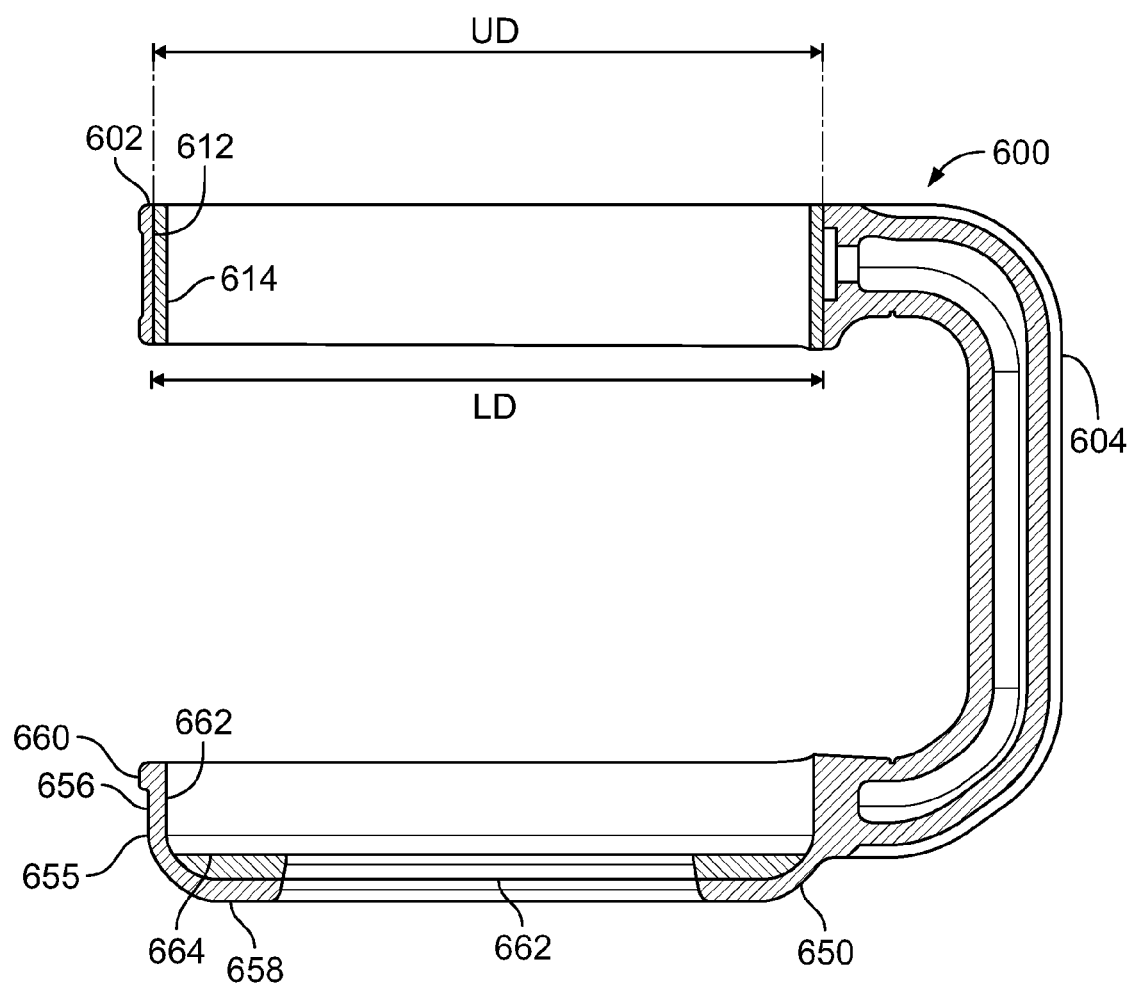
FIG. 21 depicts a side cross-sectional view of the handle shown in FIG. 18.

The handles 400, 500, 600 described herein may be formed using any process. In one example handles 400, 500, 600, may be formed using injection molding processes. In some embodiments, the handle 400, 500, 600 may be formed using a single shot injection molding process. In other embodiments, the handles 400, 500, 600 may be formed in a two shot injection molding process wherein the majority of the handle 400, 500, 600 is formed with a first shot and the engagement layers 414, 514, 614, and 644 are overmolded or formed in a second shot. Additionally, one or more of the handles 400, 500, 600 may be formed using a gas assist injection molded process wherein gas such as nitrogen gas is injected into the interior of a mold. This process may form hollow portions within the handles 400, 500, 600, and as shown with regard to handle 600 in FIG. 21 showing hollow portion 690. This process may reduce material usage and total weight of the handles 400, 500, 600. The handles 400, 500, 600 may be formed of rubber, materials including rubber, plastics, elastomers, thermoplastic elastomers (TPE), and polypropylene (PP).

In some embodiments the container 100, 200, 300 may be constructed of a material having a thermal conductivity of about 16 W/(m*K) to about 19 W/(m*K), and the handle 400, 500, 600 may be constructed of a material having a thermal conductivity of about 0.1 W/(m*K) to about 0.22 W/(m*K). Thus on a hot and/or sunny day the container 100, 200, 300 may heat up, advantageously the handle 400, 500, 600, however, may stay relatively cool. Similarly on a cold day the container 100, 200, 300 may get cold, advantageously the handle 400, 500, 600, however, may stay relatively cool warm. Thus, in certain embodiments the ratio of thermal conductivity of the container 100, 200, 300 to the thermal conductivity of the handle 400, 500, 600 may be in the range of about 85 to about 160 or in the range of about 72 to about 190.

Combinations of certain containers 100, 200, and 300, and handles 400, 500, 600 may be included together in kits including for example container 100 and handle 400 with container 200 and handle 500; container 100 and handle 400 with container 300 and handle 600; and container 200 and handle 500 with container 300 and handle 600. As seen from the above tables and discussion, certain dimensions and ratios of dimensions may be substantially similar between the containers 100, 200, and 300, and/or handles 400, 500, 600. For example, each of the handles 100, 200, 300, may have a substantially similar ring height (RH), a substantially similar handle width (HW), and a substantially similar handle depth (HD). Additionally, for example, handles 100, and 200 may have a substantially similar handle height (HH) and a substantially similar distance from the top edge of the ring portion to the top end of the container (TH). The similar sizes may contribute to the strength and overall usability of the handles 100, 200, and 300.

The present disclosure is disclosed above and in the accompanying drawings with reference to a variety of examples. The purpose served by the disclosure, however, is to provide examples of the various features and concepts related to the disclosure, not to limit the scope of the disclosure. One skilled in the relevant art will recognize that numerous variations and modifications may be made to the examples described above without departing from the scope of the present disclosure.

The invention claimed is:

1. An insulating container comprising:
   an inner wall extending into an internal reservoir for receiving liquid;
   an outer wall forming an outer shell of the container, the outer wall having second end configured to support the container on a surface;
   a sealed vacuum cavity forming an insulated double wall structure between the inner wall and the outer wall, the insulating container having a top end;
   a removably engaged handle, the handle comprising:
      a ring portion for engaging the outer shell of the container, the ring portion having a top edge and a bottom edge; and
      a handle portion engaged with the ring portion, the handle having a height;
   wherein the inner wall and the outer wall are comprised of a first material; and wherein the removably engaged handle is comprised of a second material;
   wherein the first material has a first thermal conductivity and the second material has a second thermal conductivity, and wherein the thermal conductivity of the first material is greater than the thermal conductivity of the second material; and
   wherein the ratio of the thermal conductivity of the first material to the thermal conductivity of the second material is between about 85 and about 160.

2. The insulating container of claim 1, wherein the ring portion of the handle has a height of about 0.71 inches to about 0.79 inches.

3. The insulating container of claim 1, wherein the handle has a width of about 0.76 inches to about 0.84 inches.

4. The insulating container of claim 1, wherein the handle has a depth of about 0.58 inches to about 0.64 inches.

5. The insulating container of claim 1, wherein the handle has a height of about 3.90 inches to about 4.31 inches.

6. The insulating container of claim 1, wherein the distance between the top end of the container and the top edge of the ring portion is between about 0.75 inches to about 1.50 inches.

7. The insulating container of claim 1, further comprising an engagement layer disposed between the ring portion and the outer wall.

8. The insulating container of claim 7, wherein the engagement layer is comprised of a third material.

9. The insulating container of claim 1, wherein the top edge of the ring portion has a diameter that is greater than a diameter of the bottom edge of the ring portion.

10. The insulating container of claim 1, wherein the removably engaged handle includes a lower portion that curves or angles inward toward the container.

11. The insulating container of claim 10, wherein the removably engaged handle further comprises:
   a base portion engaged with the lower portion of the handle, the base portion having an annular wall, wherein the base portion includes a sidewall portion which forms a ring around the container, and a bottom portion which is disposed below the container.

12. The insulating container of claim 11, wherein the bottom portion of the base portion contains an aperture.

13. The insulating container of claim 11, wherein an inside surface of the base portion contains a second engagement layer, and wherein the second engagement layer is comprised of a third material.

14. A container kit comprising:
   a first container having a top end and a base and a first container height defined between the top end and the base, the first container comprising:
      an inner wall extending into an internal reservoir for receiving liquid;
      an outer wall forming an outer shell of the container;

a sealed vacuum cavity forming an insulated double wall structure between the inner wall and the outer wall;
a first handle removably engaged with the first container, the first handle comprising:
  a first handle ring portion for engaging the outer shell of the first container, the ring having a top edge defining a top diameter and a bottom edge defining a bottom diameter; and
  a first handle handle portion engaged with the ring portion, the first handle having a first handle height;
  a first engagement layer disposed on an inner surface of the first handle ring portion;
a second container having a top end and a base and a second container height defined between the top end and the base, the second container comprising:
  an inner wall extending into an internal reservoir for receiving liquid;
  an outer wall forming an outer shell of the container;
  a sealed vacuum cavity forming an insulated double wall structure between the inner wall and the outer wall;
a second handle removably engaged with the second container, the second handle comprising:
  a second handle ring portion for engaging the outer shell of the second container, the ring having a top edge defining a top diameter and a bottom edge defining a bottom diameter; and
  a second handle handle portion engaged with the second handle ring portion, the second handle having a second handle height;
a second engagement layer disposed on an inner surface of the second handle ring portion;
wherein the first container height is different than the second container height;
wherein the first container and the second container are comprised of a first material;
wherein the first handle and the second handle are comprised of a second material; and
wherein a ratio of a thermal conductivity of the first material to a thermal conductivity of the second material is between about 85 and about 160.

15. The container kit of claim 14, wherein the upper diameter of the first handle is greater than the lower diameter of the first handle, and wherein the upper diameter of the second handle is greater than the lower diameter of the second handle.

16. The container kit of claim 14, wherein each of the first and second ring portions include an upper ridge extending along an upper portion of the ring portion and lower ridge extending around a lower portion of the ring portion.

17. The container kit of claim 14, wherein each of the first and second handle portions include a lengthwise depression.

18. The container kit of claim 14, wherein the first and second ring portions each have a height; and height of the ring portion is about 0.71 inches to about 0.79 inches;
  wherein the first and second handle portions each have a handle width; and wherein the handle width is about 0.76 inches to about 0.84 inches;
  wherein the first and second handle portions each have a handle depth; and wherein the handle depth is about 0.58 inches to about 0.64 inches; and
  wherein the first and second handles each have a handle height; and wherein the handle height is about 3.90 inches to about 4.31 inches.

19. The container kit of claim 14, wherein the distance between the top end of the first container and the top edge of the first handle ring portion is substantially the same as the distance between the top end of the second container and the top edge of the second handle ring portion.

20. The container kit of claim 14, wherein the first and second handles include a lower portion that curves or angles inward toward the container.

21. The container kit of claim 14, wherein the second handle further comprises:
  a base portion engaged with the lower portion of the second handle, the base portion having an annular wall, the annular wall including a sidewall portion which forms a ring around the container and a bottom portion which is disposed below the container;
  wherein the bottom portion of the base portion contains an aperture; and
  wherein an inside surface of the base portion contains a base engagement layer.

* * * * *